United States Patent
Yim et al.

(10) Patent No.: US 10,001,869 B2
(45) Date of Patent: Jun. 19, 2018

(54) WEARABLE DEVICE AND MOBILE TERMINAL FOR SUPPORTING COMMUNICATION WITH THE DEVICE

(71) Applicant: LG ELECTRONICS INC., Seoul (KR)

(72) Inventors: Soyeon Yim, Seoul (KR); Shinhui Ahn, Seoul (KR); Youjin Jeon, Seoul (KR); Soomin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 69 days.

(21) Appl. No.: 14/885,563

(22) Filed: Oct. 16, 2015

(65) Prior Publication Data

US 2016/0110012 A1 Apr. 21, 2016

(30) Foreign Application Priority Data

Oct. 17, 2014 (KR) .................. 10-2014-0140515

(51) Int. Cl.
| | |
|---|---|
| *G06F 3/041* | (2006.01) |
| *G06F 1/16* | (2006.01) |
| *G06F 3/01* | (2006.01) |
| *H04M 1/725* | (2006.01) |

(52) U.S. Cl.
CPC ............ *G06F 3/0416* (2013.01); *G06F 1/163* (2013.01); *G06F 1/1626* (2013.01); *G06F 1/1694* (2013.01); *G06F 1/1698* (2013.01); *G06F 3/014* (2013.01); *G06F 3/017* (2013.01); *H04M 1/7253* (2013.01); *G06F 2203/0384* (2013.01); *H04M 2250/02* (2013.01); *H04M 2250/04* (2013.01); *H04M 2250/06* (2013.01);
(Continued)

(58) Field of Classification Search
CPC ...... G06F 1/1626; G06F 1/163; G06F 1/1694; G06F 1/1698
See application file for complete search history.

(56) References Cited

U.S. PATENT DOCUMENTS

| | | | |
|---|---|---|---|
| 2003/0151982 A1* | 8/2003 | Brewer ................. | G04G 21/00 368/46 |
| 2008/0195735 A1* | 8/2008 | Hodges ................ | G06F 1/1626 709/227 |

(Continued)

*Primary Examiner* — Benjamin C Lee
*Assistant Examiner* — Chun-Nan Lin
(74) *Attorney, Agent, or Firm* — Birch, Stewart, Kolasch & Birch, LLP

(57) ABSTRACT

A mobile terminal including a wireless communication unit configured to perform wireless communication with a wearable device; a touch screen; a sensor unit configured to sense at least one of a mobile terminal acceleration signal and a mobile terminal vibration signal; and a controller configured to display a screen corresponding to an application executing on the mobile terminal, receive first state information from the wearable device indicating at least one of a wearable device acceleration signal and a wearable device vibration signal of the wearable device, receive second state information from the sensor unit indicating said at least one of the mobile terminal acceleration signal and the mobile terminal vibration signal of the mobile terminal, and transfer operations of the application executing on the mobile terminal to the wearable device, based on the first and second state information.

21 Claims, 48 Drawing Sheets

(52) U.S. Cl.
CPC .... *H04M 2250/12* (2013.01); *H04M 2250/22* (2013.01); *H04M 2250/64* (2013.01)

(56) References Cited

U.S. PATENT DOCUMENTS

| | | | | |
|---|---|---|---|---|
| 2009/0051649 A1* | 2/2009 | Rondel | ............... | G06F 1/163 |
| | | | | 345/156 |
| 2010/0227556 A1* | 9/2010 | Kim | ............... | H04W 4/08 |
| | | | | 455/41.2 |
| 2013/0169546 A1* | 7/2013 | Thomas | ............... | G06F 9/4451 |
| | | | | 345/173 |
| 2014/0136986 A1* | 5/2014 | Martin | ............... | G06F 3/0488 |
| | | | | 715/748 |
| 2014/0171055 A1* | 6/2014 | Oshita | ............... | H04W 4/12 |
| | | | | 455/418 |
| 2016/0014266 A1* | 1/2016 | Bhatt | ............... | H04M 1/7253 |
| | | | | 455/556.1 |
| 2016/0035213 A1* | 2/2016 | Choi | ............... | H04L 63/107 |
| | | | | 340/669 |
| 2016/0065719 A1* | 3/2016 | Jeong | ............... | H04W 12/06 |
| | | | | 455/420 |

* cited by examiner

WEARABLE DEVICE AND MOBILE TERMINAL FOR SUPPORTING COMMUNICATION WITH THE DEVICE

CROSS-REFERENCE TO RELATED APPLICATIONS

The present application claims priority under 35 U.S.C. 119 and 35 U.S.C. 365 to Korean Patent Application No. 10-2014-0140515 filed on Oct. 17, 2014, which is hereby incorporated by reference in its entirety.

BACKGROUND OF THE INVENTION

Field of the Invention

The present disclosure relates to a wearable device for further improving user's convenience and a mobile terminal for supporting communication with the same.

Discussion of the Related Art

Functions of mobile terminals have become diversified. Mobile terminals include devices held by a user's hand like mobile phones and devices worn on a user's body, neck, head, or wrist. For example, there is a neckband type device worn on a user's neck, a headset type device worn on a user's head, or a watch type device worn on a user's wrist.

Mobile terminals have functions for data and voice communication, picture shooting and video recording through a camera, music file playback through a speaker system, and image or video output to a display unit 151. Some terminals may have an additional electronic game play function or a multimedia player function. Especially, recent mobile terminals can receive multicast signals for providing visual contents such as broadcasts and video or television programs. As functions of a terminal are diversified, such a terminal can be implemented in a form of a multimedia player with multi-functions, for example, photo or video capturing, playback of music or video files, game plays, and broadcast reception.

A watch type device is used as a watch generally and if necessary, the above-mentioned various functions are implemented. Since the weight of a watch type device is light, a function interoperating with a mobile phone is mainly used but there is a room for including a mobile phone's function. Therefore, since it is expected that a watch type device replaces a mobile phone, research and commercialization for watch type devices are being actively developed.

However, various function implementations or user interface implementations for a watch type device are not widely developed so that there are limitations in commercialization. Especially, user interface implementations according to whether a watch type device is worn are insufficient and it is still insufficient to implement various user conveniences between a wearable device such as a watch type device and a mobile terminal.

SUMMARY OF THE INVENTION

Embodiments provide a method of further improving user convenience based on a user gesture occurring between a mutual communication wearable device and a mobile terminal.

In one embodiment, a wearable device communicable with a terminal is provided. The device includes a touch screen through which an input/output of information is available; a communication unit configured to perform communication with the terminal; a sensor unit including an acceleration sensor or a gyroscope sensor and configured to sense first state information of the wearable device; and a controller configured to control an image displayed on the touch screen based on the first state information sensed by the sensor unit, wherein the controller is configured to control the image displayed on the touch screen by using second state information and the first state information, the second state information being state information of the terminal delivered from the terminal.

In another embodiment, provided is a terminal communicable with a device, the device including a means that senses an acceleration signal or a vibration signal as first state information and a screen where an input/output of information is available. The terminal includes: a communication unit configured to perform communication with the device and receive a signal sensed by the device; a touch screen configured to display an executed application; a sensor unit configured to sense an acceleration signal or a vibration signal as second state information corresponding to state information of the terminal; and a controller configured to transmit information related to the executed application to the device and to control the tough screen to display an image for executing application on the device.

The details of one or more embodiments are set forth in the accompanying drawings and the description below. Other features will be apparent from the description and drawings, and from the claims.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE EMBODIMENTS

Figure 1:
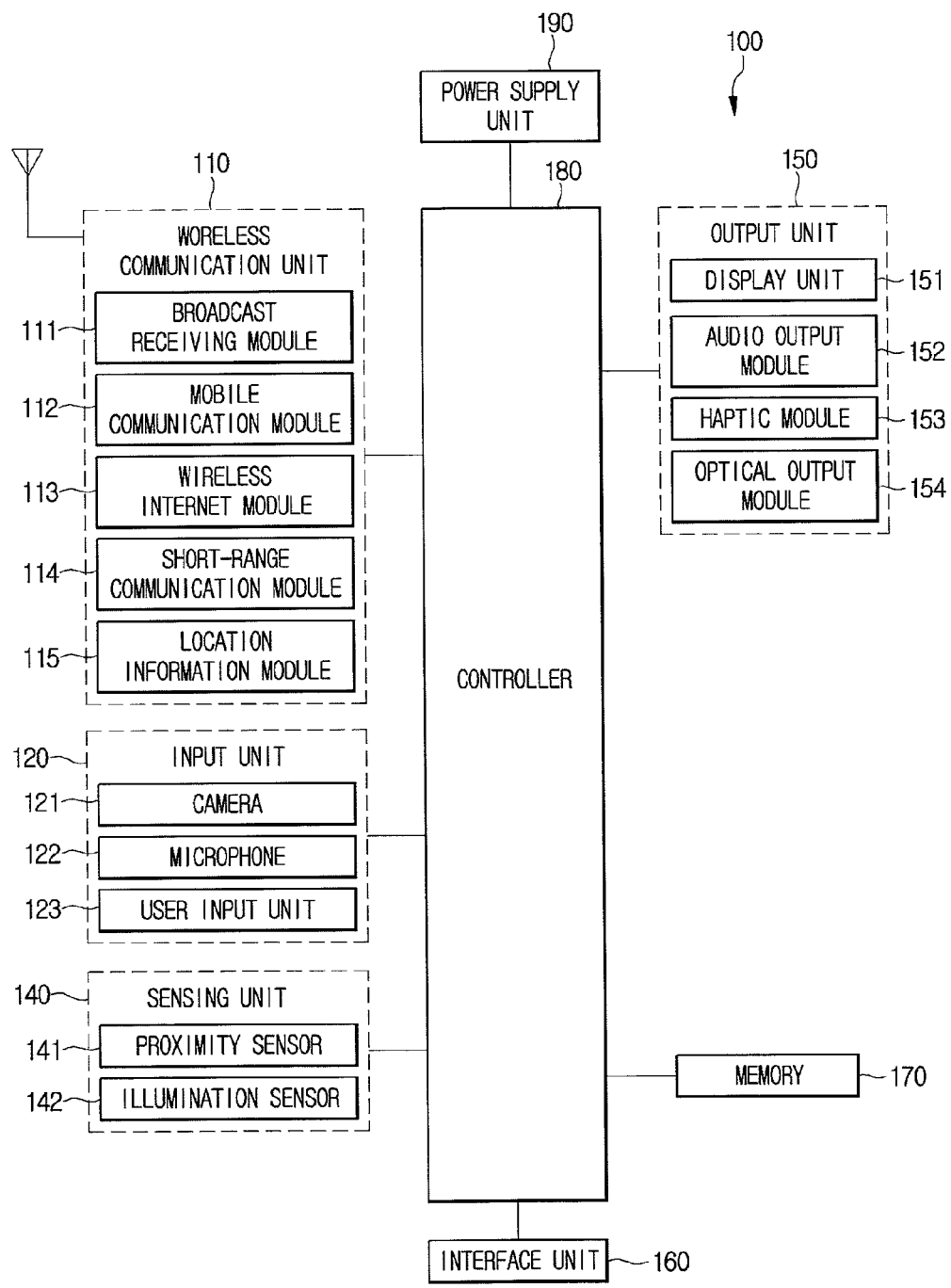
FIG. 1 is a block diagram illustrating a mobile terminal or a wearable device according to an embodiment of the present invention.

Hereinafter, embodiments of the present invention are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves.

Additionally, the accompanying drawings are used to help easily understanding embodiments disclosed herein but the technical idea of the present invention is not limited thereto. It should be understood that all of variations, equivalents or substitutes contained in the concept and technical scope of the present invention are also included. It will be understood that the terms "first" and "second" are used herein to describe various components but these components should not be limited by these terms. These terms are used only to distinguish one component from other components.

In the below disclosure, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

The terms of a singular form may include plural forms unless they have a clearly different meaning in the context. Additionally, in this specification, the meaning of "include," "comprise," "including," or "comprising," specifies a property, a region, a fixed number, a step, a process, an element and/or a component but does not exclude other properties, regions, fixed numbers, steps, processes, elements and/or components.

FIG. 1 is a block diagram illustrating a mobile terminal or a wearable device according to an embodiment of the present invention. For reference, the block diagram shown in FIG. 1 is applicable to both a wearable device such as a watch type device and a mobile terminal communicable with the wearable device. First, a case of a watch type mobile terminal among wearable devices is described.

Referring to FIG. 1, the device 100 may include a wireless communication unit 110, an input unit 120, a sensing unit 140, an output unit 150, an interface unit 160, a memory 170, a controller 180, and a power supply unit 190. In implementing a watch type device, all components shown in FIG. 1 are not necessary, so that a watch type device described in this specification may include components less or more than the components listed above.

In more detail, the wireless communication unit 110 may include at least one module allowing wireless communication between the watch type device 100 and a wireless communication system, between the watch type device 100 and another watch type device 100, or between the watch type device 100 and an external server. Additionally, the wireless communication unit 110 may include at least one module connecting the watch type device 100 to at least one network.

The wireless communication unit 110 may include at least one of a broadcast receiving module 111, a mobile communication module 112, a wireless internet module 113, a short-range communication module 114, and a location information module 115.

The input unit 120 may include a camera 121 or an image input unit for image signal input, a microphone 122 or an audio input unit for audio signal input, and a user input unit 123 (for example, a touch key and a mechanical key)) for receiving information from a user. Voice data or image data collected by the input unit 120 are analyzed and processed as a user's control command.

The sensing unit 140 may include at least one sensor for sensing at least one of information in a watch type device, environmental information around a watch type device, and user information. For example, the sensing unit 140 may include at least one of a proximity sensor 141, an illumination sensor 142, an acceleration sensor, a photoplethysmographic sensor, a touch sensor, a magnetic sensor, a G-sensor, a gyroscope sensor, a motion sensor, an RGB sensor, an infrared (IR) sensor, a finger scan sensor, an ultrasonic sensor, an optical sensor (for example, a camera 121), a microphone 122, a battery gauge, an environmental sensor (for example, a barometer, a hygrometer, a thermometer, a radiation sensor, a thermal sensor, and a gas sensor), and a chemical sensor (for example, an electronic noise, a healthcare sensor, and a biometric sensor). Moreover, a watch type device disclosed in this specification can combine information sensed by at least two or more sensors among such sensors and then utilize it.

The output unit 150 is used to generate a visual, auditory, or haptic output and may include at least one of a display unit 151, an audio output unit 152, a haptic module 153, and an optical output unit 154. The display unit 151 can be formed with a mutual layer structure with a touch sensor or formed integrally, so that a touch screen can be implemented. Such a touch screen may serve as the user input unit 123 providing an input interface between the watch type device 100 and a user and an output interface between the watch type device 100 and a user at the same time.

The interface unit 160 serves as a path to various kinds of external devices connected to the watch type device 100. The interface unit 160 may include at least one of a wired/wireless headset port, an external charger port, a wired/wireless data port, a memory card port, a port connecting a device equipped with an identification module, an audio Input/Output (I/O) port, a video I/O port, and an earphone port. In correspondence to that an external device is connected to the interface unit 160, the watch type device 100 can perform an appropriate control relating to the connected external device.

Additionally, the memory 170 can store data supporting various functions of the watch type device 100. The memory 170 may store a plurality of application programs or applications running on the watch type device 100, and data and commands for operations of the watch type device 100. At least part of such an application program can be downloaded from an external server through a wireless communication. Additionally, at least part of such an application program can be included in the watch type device 100 from the time of shipment in order to perform a basic function (for example, an incoming call, a calling function, and a message reception) of the watch type device 100. Moreover, an application program can be stored in the memory 170 and installed on the watch type device 100, so that it may run to perform an operation (or a function) of the watch type device 100 by the controller 180.

The controller 180 controls overall operations of the mobile terminal 100 generally besides an operation relating to the application program. The controller 180 can provide appropriate information or functions to a user or process them by processing signals, data, and information input/output through the above components or executing application programs stored in the memory 170.

Additionally, in order to execute an application program stored in the memory 170, the controller 180 can control at least part of the components shown in FIG. 1. Furthermore, in order to execute the application program, the controller 180 can combine at least two of the components in the watch type device 100 and may then operate it.

The power supply unit 190 can receive external power or internal power under a control of the controller 180 and then supply power to each component in the watch type device 100. The power supply unit 190 includes a battery and the battery can be a built-in battery or a replaceable battery.

At least part of the each component may operate cooperatively in order to implement operations, controls, or control methods of a watch type device according to various embodiments of the present invention described below. Additionally, the operations, controls, or control methods of a watch type device can be implemented on the mobile terminal 100 by executing at least one application program stored in the memory 170.

Hereinafter, prior to examining various embodiments implemented through the watch type device 100, the above-listed components are described in more detail with reference to FIG. 1. First, in describing the wireless communication unit 110, the broadcast receiving module 111 of the wireless communication unit 110 can receive a broadcast signal and/or broadcast related information from an external broadcast management server through a broadcast channel. The broadcast channel may include a satellite channel and a terrestrial channel. At least two broadcast receiving modules for simultaneous broadcast reception for at least two broadcast channels or broadcast channel switching can be provided to the watch type device 100.

The mobile communication module 112 can transmit/receive a wireless signal to/from at least one of a base station, an external terminal, and a server on a mobile communication network established according to the technical standards or communication methods for mobile communication (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A)). The wireless signal may include various types of data according to a voice call signal, a video call signal, or text/multimedia message transmission.

The wireless internet module 113 refers to a module for wireless internet access and can be built in or external to the watch type device 100. The wireless internet module 113 can be configured to transmit/receive a wireless signal in a communication network according to wireless internet technologies.

The wireless internet technology may include Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A) and the wireless internet module 113 transmits/receives data according at least one wireless internet technology including internet technology not listed above.

The short-range communication module 114 may support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The short-range communication module 114 may support wireless communication between the watch type device 100 and a wireless communication system, between the watch type device 100 and another watch type device 100 or between networks including the watch type device 100 and another watch type device 100 (or an external server) through wireless area networks. The wireless area networks can be wireless personal area networks.

The location information module 115 is a module for obtaining the location (or the current location) of a watch type device and its representative examples include a global positioning system (GPS) module or a Wi-Fi module. For example, a watch type device may obtain its location by using a signal transmitted from a GPS satellite through the GPS module. As another example, a watch type device may obtain its location based on information of a wireless access point (AP) transmitting/receiving a wireless signal to/from the Wi-Fi module, through the Wi-Fi module. If necessary, the position information module 115 can perform a function of another module in the wireless communication unit 110 in order to obtain data on the location of a watch type device substitutionally or additionally. The location information module 115 is a module for obtaining the position (or the current position) of a watch type device and is not limited to a module directly calculating and obtaining the position of a watch type device.

Then, the input unit 120 is used for inputting image information (or signal), audio information (or signal), data, or information input from a user and the watch type device 100 can include at least one camera 121 in order for inputting image information. The camera 121 processes image frames such as a still image or a video obtained by an image sensor in a video call mode or a capturing mode. The processed image frame can be displayed on the display unit 151 or stored in the memory 170. Moreover, a plurality of cameras 121 equipped in the watch type device 100 can be arranged in a matrix structure and through the camera 121 having such a matrix structure, a plurality of image information having various angles or focuses can be input to the watch type device 100. Additionally, the plurality of cameras 121 can be arranged in a stereo structure to obtain the left and right images for implementing a three-dimensional image.

The microphone 122 processes external sound signals as electrical voice data. The processed voice data can be utilized variously according to a function (or an application program being executed) being performed in the watch type device 100. Moreover, various noise canceling algorithms for removing noise occurring during the reception of external sound signals can be implemented in the microphone 122.

The user input unit 123 is to receive information from a user and when information is input through the user input unit 123, the controller can control an operation of the watch type device 100 to correspond to the input information. The user input unit 123 may include a mechanical input means (or a mechanical key, for example, a button, a dome switch, a jog wheel, and a jog switch at the front, back or side of the watch type device 100) and a touch type input means. As one example, a touch type input means may include a virtual key, a soft key, or a visual key, which is displayed on a touch screen through software processing or may include a touch key disposed at a portion other than the touch screen. Moreover, the virtual key or visual key may have various forms and can be disposed on a touch screen and for example, may include graphic, text, icon, video, or a combination thereof.

Moreover, the sensing unit 140 can sense at least one of information in a watch type device, environmental information around a watch type device, and user information and may then generate a sensing signal corresponding thereto. Based on such a sensing signal, the controller 180 can control the drive or control of the watch type device 100 or can perform data processing, functions, or operations relating to an application program installed in the watch type device 100. Representative sensors among various sensors included in the sensing unit 140 will be described in more detail.

First, the proximity sensor 141 refers to a sensor detecting whether there is an object approaching a predetermined detection surface or whether there is an object around by using the strength of an electromagnetic field or infrared, without mechanical contact. The proximity sensor 141 may disposed in an inner area of a watch type device surrounded by the touch screen or around the touch screen.

Examples of the proximity sensor 141 include a transmission-type photoelectric sensor, a direct reflective-type photoelectric sensor, a mirror reflective-type photoelectric sensor, a high-frequency oscillation-type proximity sensor, a capacitive-type proximity sensors, a magnetic-type proximity sensor, and an infrared proximity sensor. If the touch screen is a capacitive type, the proximity sensor 141 can be configured to detect the proximity of an object by changes in an electric field according to the proximity of the object having conductivity. In this instance, the touch screen (or a touch sensor) itself can be classified as a proximity sensor.

Moreover, for convenience of description, an action for recognizing the position of an object on the touch screen as the object is close to the touch screen without contacting the touch screen is called "proximity touch" and an action that the object actually contacts the touch screen is called "contact touch". A position that an object is proximity-touched on the touch screen is a position that the object vertically corresponds to the touch screen when the object is proximity-touched. The proximity sensor 141 may detect a proximity touch and a proximity touch pattern (for example, a proximity touch distance, a proximity touch direction, a proximity touch speed, a proximity touch time, a proximity touch position, and a proximity touch movement state). Moreover, the controller 180 processes data (for information) corresponding to a proximity touch operation and a proximity touch pattern, detected through the proximity sensor 141, and furthermore, may output visual information corresponding to the processed data on the touch screen. Furthermore, according to whether a touch for the same point on the touch screen is a proximity touch or a contact touch, the controller 180 may control the watch type device 100 to process different operations or data (or information).

The touch sensor detects a touch (or a touch input) applied to the touch screen (or the display unit 151) by using at least one of various touch methods, for example, a resistive film method, a capacitive method, an infrared method, an ultrasonic method, and a magnetic field method. For example, the touch sensor can be configured to convert a pressure applied to a specific portion of the touch screen or changes in capacitance occurring at a specific portion into electrical input signals. The touch sensor can be configured to detect a position and area that a touch target applying a touch on the touch screen touches the touch sensor, a pressured when touched, and a capacitance when touched. Here, the touch target, as an object applying a touch on the touch sensor, can be a finger, a touch pen, a stylus pen, or a pointer, for example.

In such a manner, when there is a touch input on the touch sensor, signal(s) corresponding thereto are sent to a touch controller. The touch controller processes the signal(s) and then transmits corresponding data to the controller 180. Therefore, the controller 180 may recognize which area of the display unit 151 is touched. Herein, the touch controller can be an additional component separated from the controller 180 or can be the controller 180 itself.

The photoplethysmographic sensor detects a light emitted from a light emitting unit (for example, a light emitting diode) from a light receiving unit (for example, a photo diode) and measures a hear rate by using the detected result. A structure of the photoplethysmographic sensor 144 and a user interface implementation using the photoplethysmographic sensor are described in more detail later.

Moreover, the controller 180 can perform different controls or the same control according to types of a touch target touching the touch screen (or a touch key equipped separated from the touch screen). Whether to perform different controls or the same control according to types of a touch target can be determined according to a current operation state of the watch type device 100 or an application program in execution. Moreover, the above-mentioned touch sensor and proximity sensor are provided separately or combined and can thus sense various types of touches, for example, short (or tap) touch), long touch, multi touch, drag touch, flick touch, pinch-in touch, pinch-out touch, swipe touch, and hovering touch for the touch screen.

The display unit 151 can display (output) information processed in the watch type device 100. For example, the display unit 151 may display execution screen information of an application program running on the watch type device 100 or user interface (UI) and graphic user interface (GUI) information according to such execution screen information. Additionally, the display unit 151 can be configured as a three-dimensional display unit displaying a three-dimensional image.

The audio output unit 152 can output audio data received from the wireless communication unit 110 or stored in the memory 170 in a call signal reception or call mode, a recording mode, a voice recognition mode, or a broadcast reception mode. The audio output unit 152 may output a sound signal relating to a function (for example, a call signal reception sound and a message reception sound) performed by the mobile terminal 100. The audio output unit 152 may include a receiver, a speaker, and a buzzer.

The haptic module 153 generates various haptic effects that a user can feel. A representative example of a haptic effect that the haptic module 153 generates is vibration. The intensity and pattern of vibration generated by the haptic module 153 can be controlled by a user's selection or a setting of a controller. For example, the haptic module 153 may synthesize and output different vibrations or output different vibrations sequentially.

The optical output unit 154 outputs a signal for notifying event occurrence by using light of a light source of the watch type device 100. An example of an event occurring in the watch type device 100 includes message reception, call signal reception, missed calls, alarm, schedule notification, e-mail reception, and information reception through an application.

The interface unit 160 may serve as a path to all external devices connected to the watch type device 100. The interface unit 160 may receive data from an external device, receive power and deliver it to each component in the watch type device 100, or transmit data in the watch type device 100 to an external device. For example, the interface unit 160 may include a wired/wireless headset port, an external charger port, a wired/wireless data port, a memory card port, a port connecting a device equipped with an identification module, an audio I/O port, a video I/O port, and an earphone port.

Moreover, the identification module, as a chip storing various information for authenticating usage authority of the watch type device 100, may include a user identity module (UIM), a subscriber identity module (SIM), and a universal subscriber identity module (USIM). A device equipped with an identification module (hereinafter referred to as an identification device) can be manufactured in a smart card form. Accordingly, the identification device can be connected to a mobile through the interface unit 160.

Moreover, as mentioned above, the controller 180 can control operations relating to an application program and overall operations of the watch type device 100 in general. For example, if a state of a watch type device satisfies set conditions, the controller 180 can execute or release a lock state limiting an output of a control command of a user for applications.

Additionally, the controller 180 can perform a control or processing relating to a voice call, data communication, and a video call can perform pattern recognition processing for recognizing handwriting input or drawing input on the touch screen as a text and an image, respectively. Furthermore, the controller 180 can use at least one or a combination of the above components to perform a control in order to implement various embodiments described below on the watch type device 100.

The power supply unit 190 can receive external power or internal power under a control of the controller 180 and then supply power necessary for an operation of each component. The power supply unit 190 includes a battery. The battery is a rechargeable built-in battery and can be detachably coupled to a terminal body in order for charging. Additionally, the power supply unit 190 may include a connection port and the connection port can be configured as one example of the interface unit 160 to which an external charger supplying power for charging of the battery is electrically connected.

As another example, the power supply unit 190 can be configured to charge a battery through a wireless method without using the connection port. In this instance, the power supply unit 190 may receive power from an external wireless power transmission device through at least one of an inductive coupling method based on a magnetic induction phenomenon, and a magnetic resonance coupling method based on an electromagnetic resonance phenomenon.

Figure 2A:
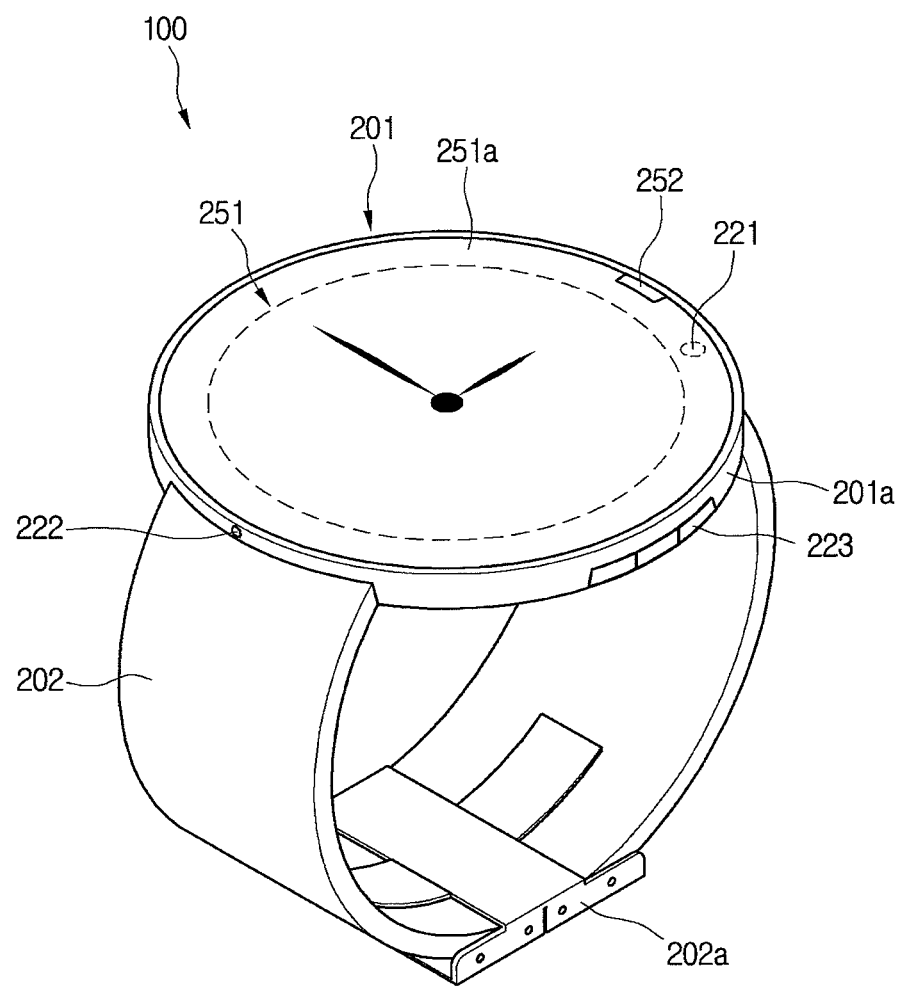
FIG. 2A and FIG. 2B are conceptual diagrams when a watch type device is seen in different directions according to an embodiment of the present invention.
Figure 2B:
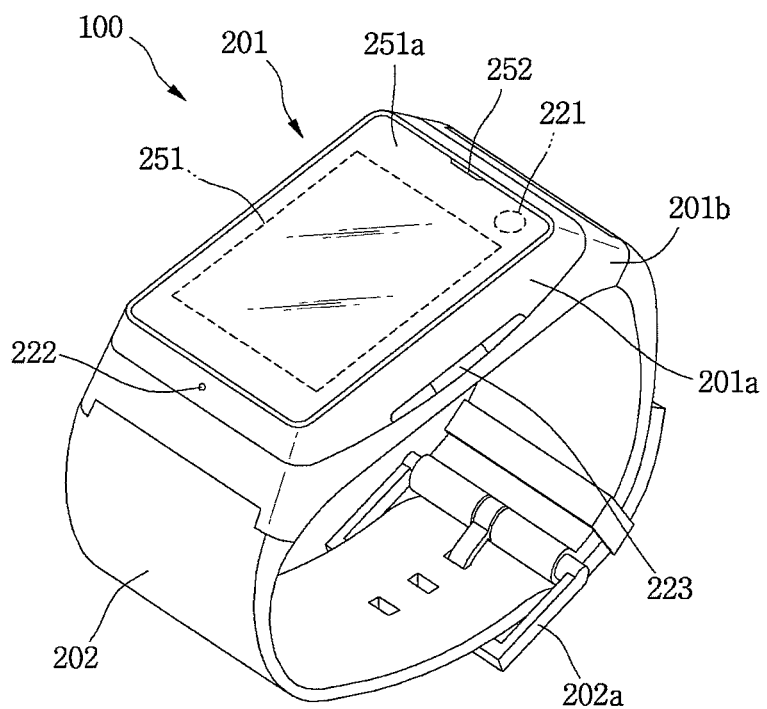

Next, FIG. 2A and FIG. 2B are conceptual diagrams when a watch type device is seen in different directions according to an embodiment of the present invention. Referring to FIGS. 2A and 2B, the watch type terminal 100 includes a main body 201 with a display unit 203 and a band 202 connected to the main body 201 to be worn on a wrist. The main body 201 includes a case for forming the appearance.

The main body 301 is separated into a first case and a second case for preparing an inner space to receive various electronic components and they can be coupled to each other. As another example, the main body 201 may have an integral form without being separated into first and second cases.

The watch type terminal 100 can be configured to allow wireless communication and an antenna can be installed at the main body 201 in order for the wireless communication. Moreover, the antenna can expand its performance by using a case. For example, a case including a conductive material can be configured to be electrically connected to an antenna in order to expand a ground area or a radiation area.

The display unit 203 is disposed at the front of the main body 201 to output information. A touch sensor can be provided at the display unit to be implemented as a touch screen. The display unit 203 can be the display unit 151 shown in FIG. 1 but is not limited thereto.

The main body 201 may include an audio output unit 152, a camera 121, and a microphone 122. When the display unit 203 is implemented as a touch screen, it can function as a user input unit and accordingly, there is no additional key required at the main body 201.

The band 202 is worn on a wrist to wrap it and can be formed of a flexible material in order for easy wearing. As such an example, the band 202 can be formed of leather, rubber, silicon, and synthetic resin. Additionally, the band 202 can be can be configured to be detachable from the body 201, so that it can be replaced with various forms of bands according to user preferences. Moreover, the band 202 can be used to expand the performance of an antenna. For example, a ground expansion unit electrically connected to an antenna to expand a ground area can be built in a band.

The band 202 may include a fastener and can be a buckle, a snap-fit available hook structure, or Velcro (a brand name)

and may include a stretchable interval or material. This drawing illustrates an example that the fastener 302*a* is implemented in a buckle form. As another example, the band 202 may have an integrated form formed of a flexible material without a fastener so that it can be worn on a wrist through a user's hand. Moreover, a heartbeat sensor using a photo diode can be disposed at the main body 201.

Figure 3A:
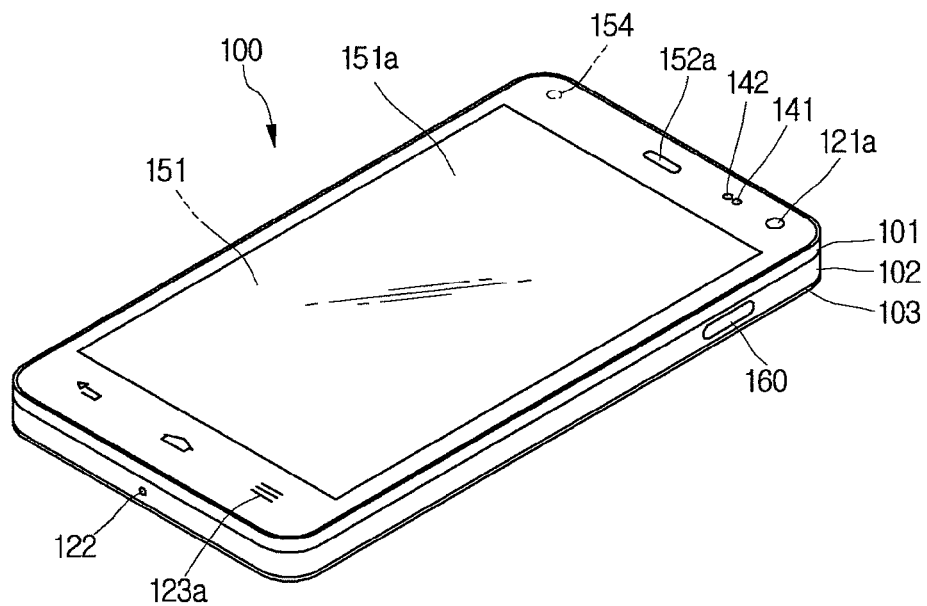
FIGS. 3A to 4 are views illustrating a mobile terminal according to an embodiment of the present invention.
Figure 3B:
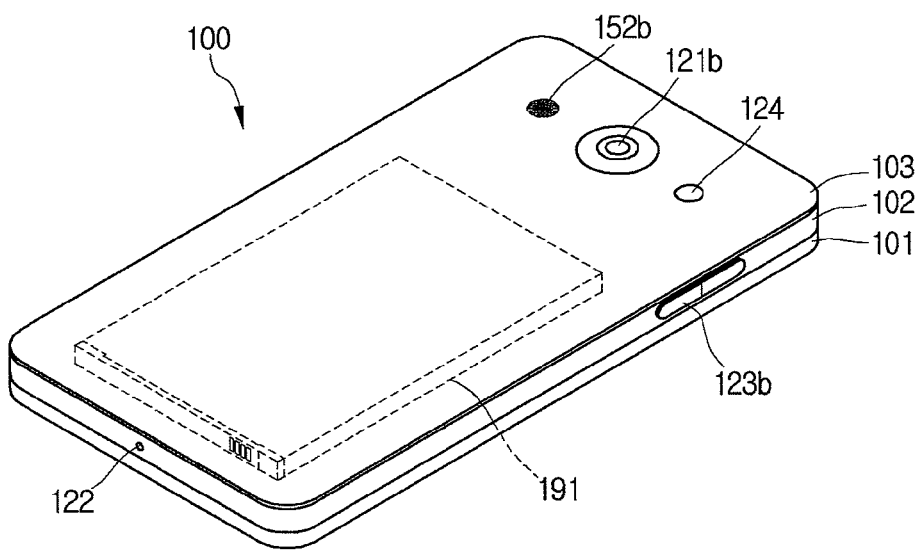
Figure 4:
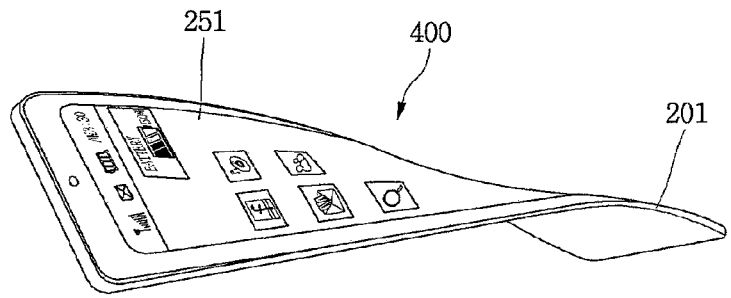

Moreover, as described above, the block diagram shown in FIG. 1 is applicable to a mobile terminal communicably connected to a watch type device and such a mobile terminal can be configured as shown in FIGS. 3A, 3B, and 4.

As shown in FIGS. 3A and 3B, a display unit 151, a first audio output unit 152*a*, a proximity sensor 141, an illumination sensor 142, an optical output unit 154, a first camera 121*a*, and a first manipulation unit 123*a* can be disposed at the front of the mobile terminal 300. A second manipulation unit 123*b*, a microphone 122, and an interface unit 160 can be disposed at a side of the terminal body. A second audio output unit 152*b* and a second camera 121*b* can be disposed at a rear of the terminal body.

However, such a terminal configuration is not limited to such an arrangement. These configurations can be excluded or replaced or disposed at a different side, if necessary. For example, the first manipulation unit 123*a* may not be disposed at the front of the terminal body and the second audio output unit 152*b* can be disposed at a side of the terminal body instead of the back of the terminal body.

Moreover, the display unit 151 of the mobile terminal can be can be configured to be transformed by external force. That is, as shown in FIG. 4, in a device having such a transformable display unit 251, an operation of a device or an image displayed on the display unit 251 can be controlled based on state information according to the ideas of the present invention.

The transformation can be at least one of warping, bending, folding, twisting, and curling of the display unit 251. Additionally, the transformable display unit 251 can be referred to as a flexible display. Herein, the flexible display unit 251 may include a general flexible display, an e-paper, and a combination thereof. In general, the mobile terminal 300 or 400 may have the same or similar features to the wearable device or the mobile terminal of FIG. 1.

The general flexible display is a light, easily unbreakable, and durable display that maintains the features of an existing flat panel display and is manufactured on a thin flexible substrate where warping, bending, folding, twisting, and curling are possible. Additionally, the e-paper uses a display technique applying the feature of a general ink and is different from an existing flat panel display in that it uses reflected light. The e-paper may change information by using electrophoresis with a twist ball or a capsule.

When the flexible display unit 251 is not transformed (for example, a state having an infinite curvature radius, hereinafter referred to as a first state), the display area of the flexible display unit 251 becomes flat. When the flexible display unit 251 is transformed by external force in the first state (for example, a state having a finite curvature radius, hereinafter referred to as a second state), the display area of the flexible display unit 251 becomes a curved surface. As shown in the drawing, information displayed in the second state can be visual information output on the curved surface. Such visual information can be implemented by separately controlling the light emission of a sub-pixel disposed in a matrix. The sub-pixel means a minimum unit for implementing one color.

The flexible display unit 251 can be in a warping state (for example, a vertically or horizontally warped state) instead of a flat state during the first state. In this instance, when external force is applied to the flexible display unit 251, the flexible display unit 251 can be transformed into a flat state (or a less warped state) or a more warped state.

Moreover, the flexible display unit 251 can be combined with a touch sensor to implement a flexible touch screen. When a touch is made on the flexible touch screen, the controller 180 of FIG. 1 can perform a control corresponding to such a touch input. The flexible touch screen can be can be configured to detect a touch input in both the first state and the second state.

Moreover, the mobile terminal 400 according to a modified embodiment of the present invention may include a transformation detection mechanism for detecting the transformation of the flexible display unit 251. Such a transformation detection mechanism can be included in the sensing unit 140 of FIG. 1.

The transformation detection mechanism can be provided at the flexible display unit 251 or the case 201, so that it can detect information relating to the transformation of the flexible display unit 251. Herein, the information relating to transformation includes a direction in which the flexible display unit 251 is transformed, the degree of transformation, a position where the flexible display unit 251 is transformed, a time that the flexible display unit 251 is transformed, and a restoring acceleration of the flexible display unit 251 and may further include various detectable information due to the warping of the flexible display unit 251.

Additionally, based on information relating to the transformation of the flexible display unit 251 detected by the transformation detection mechanism, the controller 180 can change the information displayed on the display unit 251 or generate a control signal for controlling a function of the mobile terminal 400.

Moreover, the mobile terminal 400 according to a modified embodiment of the present invention may include a case 201 for receiving the flexible display unit 251. The case 201 can be can be configured to be transformed together with the flexible display unit 251 by external force in consideration of characteristics of the flexible display unit 251.

Furthermore, a battery equipped in the mobile terminal 400 can be configured to be transformed together with the flexible display unit 251 by external force in consideration of characteristics of the flexible display unit 251. In order to implement the battery, a stack and folding method for stacking up battery cells can be applied. A transformed state of the flexible display unit 251 is not limited to an external force. For example, when the flexible display unit 251 has the first state, it is transformed into the second state by a command of a user or an application.

Hereinafter, embodiments relating to a watch type device configured in such a manner and a control method that can be implemented in such a mobile terminal are described with reference to the accompanying drawings. It is apparent to those skilled in the art that the present invention can be specified in a different specific form without departing from the scope and essential features of the present invention.

Figure 5:
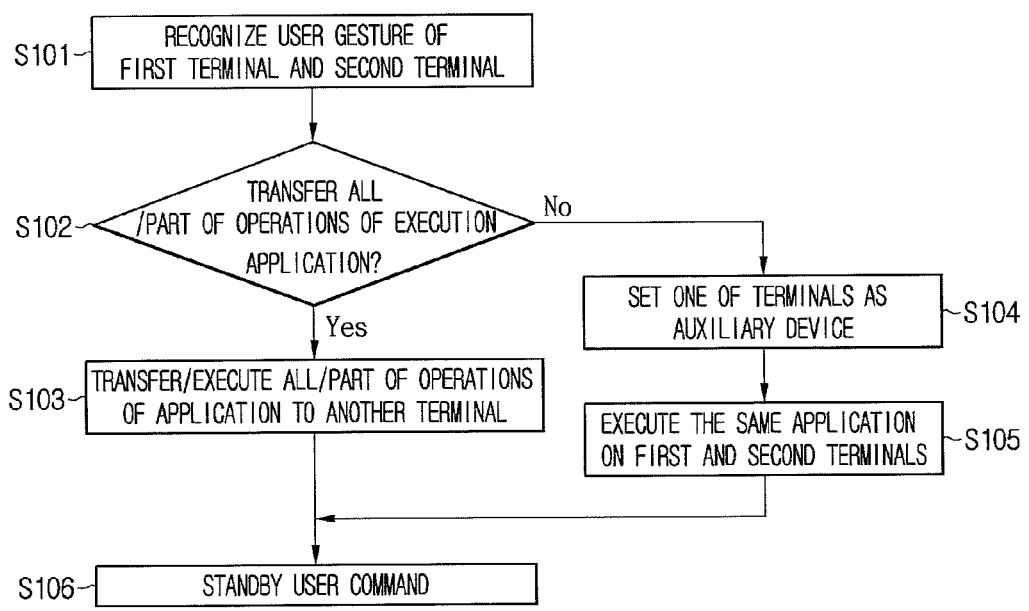
FIG. 5 is a flowchart illustrating operations performed between terminals according to a gesture occurring between a first terminal and a second terminal according to an embodiment of the present invention.
Figure 6:
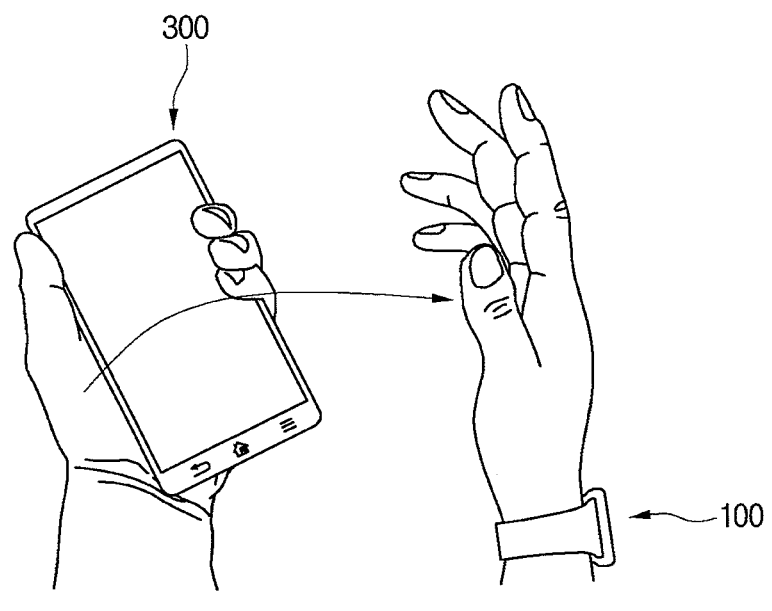
FIG. 6 is a view illustrating a gesture taken by a user through first and second terminals according to an embodiment of the present invention.
Figure 6:
Figure 6:
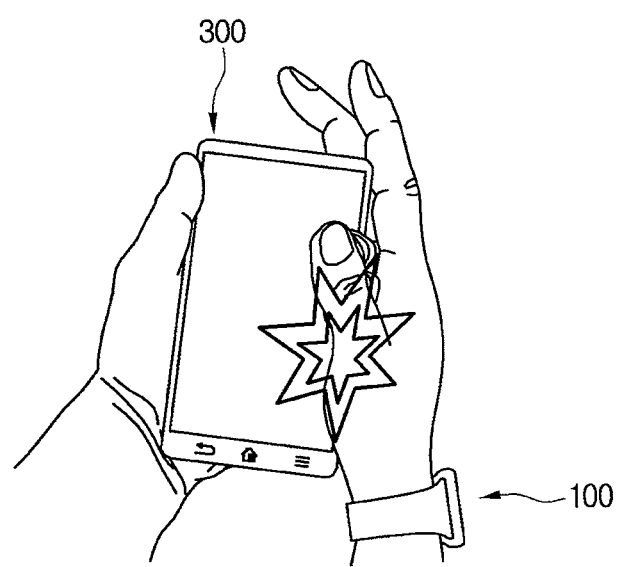

FIG. 5 is a flowchart illustrating operations performed between terminals according to a gesture occurring between first and second terminals according to an embodiment of the present invention, and FIG. 6 is a view illustrating a gesture taken by a user by using first and second terminals according to an embodiment of the present invention. In the description below, the first terminal refers to a wearable device such as a watch type device and the second terminal refers to a handheld type smartphone. According to the description, it is simply referred to as a watch type device or a wearable device.

When a smartphone (for example, the second terminal) and a watch type terminal (for example, the first terminal) are used together, the second terminal can be gripped by a hand in which the first terminal is worn or the first terminal and the second terminal can be used with different hands. In each case, an application operation can be determined between terminals according to a gesture taken by a user. Herein, a gesture taken by a user, as shown in FIG. 6, can be that vibration is applied to a hand where the first teiminal 100 is worn by swinging the second terminal 300.

Further, while the first terminal 100 and the second terminal 300 are worn on/gripped by different hands, a hand wearing the first terminal 100 applies vibration/impact to the second terminal 300. In this instance, a swing operation recognized by a sensor unit of a terminal is detected by only the first terminal 100 and only the vibration is detected by the second terminal 300.

User gestures of more various embodiments are described with reference to the accompanying drawings. Moreover, referring to FIG. 5, the first terminal and the second terminal can be connected to each other for mutual communication and detect a swing gesture, a vibration gesture, and positions in vertical and horizontal directions by a sensor unit in each thereof.

The first terminal and the second terminal recognize a gesture applied by a user in operation S101 and determine whether the recognized gesture is a command for requesting all or part of application operations in execution currently to be transferred to another terminal in operation S102. If there are applications in execution in the first terminal or the second terminal, only a menu function for controlling an application operation can be transferred or an application executed in the first terminal can be executed in the second terminal according to a setting of a corresponding application.

When the recognized gesture is determined as a gesture for transferring all or part of items relating to an operation of an application in execution, a main device and a sub device are determined between the first terminal and the second terminal. Herein, the main device is a terminal where an application is in execution and the sub device is a terminal for receiving and executing a corresponding application by a user gesture. Moreover, an auxiliary device described below performs an auxiliary function (for example, although the same application is executed in the first and second terminals, one of them displays a virtual keyboard or a list in order for an operation of a corresponding application).

When a terminal detects vibration together with a swing gesture or only vibration, since the user gestures are different, settings of a main device and a sub device are easy. That is, a device that detects vibration together with a swing movement (for example, an acceleration signal) can be set as a main device and a device that detects only vibration can be set as a sub device. For example, for the user gesture shown in FIG. 6, the second terminal 300 detects a swing movement and a vibration when it contacts a hand, and the first terminal 100 detects only a vibration due to the swinging second terminal 300 contacting the hand. In addition, all or part of operations of an application being executed in the second terminal 300 is transferred to the first terminal 100 between the first terminal 100 and the second terminal 300.

Moreover, when it is determined that a user gesture detected between the first terminal 100 and the second terminal 300 is not a gesture for transferring all or part of operations of an application in execution to another device, a process for setting an auxiliary device with respect to one of the terminals 100 and 300 is performed in operation S104.

For example, vibration can be detected by a sensor unit included in each of the first and second terminals 100 and 300 when the first and second terminals 100 and 300 are disposed vertically. When a smartphone descends from top to bottom and contacts the palm of an arm wearing a watch type terminal, a vertical position relationship is detected between terminals. In this instance, this is not a command for transferring all or part of operations of an application and it means that the first terminal and the second terminal serve as a mutually auxiliary role in order for single application driving in operation S105. Various embodiments for this will be described in more detail below.

Hereinafter, a user gesture shown in FIG. 6 is defined as a first user gesture. The first user gesture indicates an operation for swinging the second terminal 300 and contacting the hand wearing the first terminal 100 (that is, a watch type terminal) when a user wears/grips the first terminal 100 and the second terminal 300 by different hands.

Figure 7:
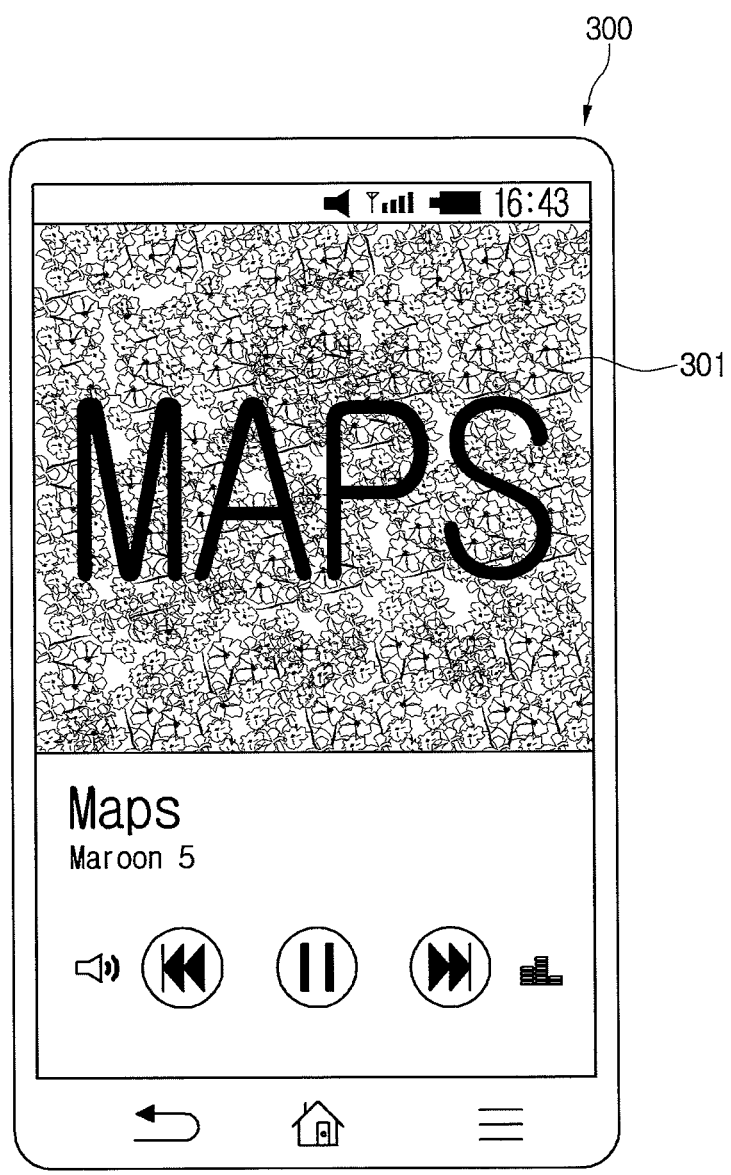
FIGS. 7 and 8 are views illustrating operations of a first terminal and a second terminal according to an embodiment of the present invention.
Figure 8:
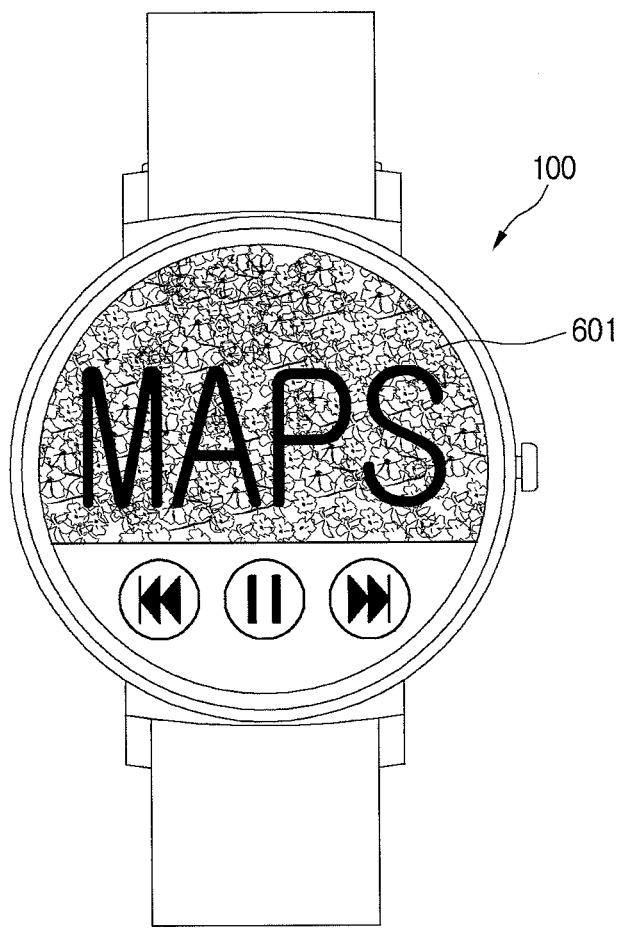

FIGS. 7 and 8 are views illustrating operations of a first terminal and a second terminal according to an embodiment of the present invention. When the first terminal 100 and the second terminal 300 shown in FIGS. 7 and 8 are worn by a user as shown in FIG. 6, a first user gesture is performed.

In this instance, the first terminal 100 detects only vibration by impact and the second terminal 300 detects vibration (for example, vibration signals) together with a swing movement (for example, acceleration signals). The second terminal 300 becomes a main device and the first terminal 100 becomes a sub device. Accordingly, a control for transferring all or part of operations of an application executed on the main device to the sub device is performed.

For example, as shown in FIG. 7, a music application is being executed on the second terminal 300 and a music main UI 301 relating to music application playback and setting is displayed on the screen. Then, the screen of the first terminal 100 can be in an off or lock state. In such a case, when vibration is applied to the second terminal 300 by swinging and contacting a hand wearing the first terminal 100, all or part of operations of a music application being executed on the second terminal 300 can be transferred to the first terminal 100.

When part of operations of an application in execution is transferred as shown in FIG. 8, information on music being played by a music application executed on the second terminal 300 and a music control UI 601 including menu buttons relating to operations of the music application are displayed on the screen of the first terminal 100. When the screen of the first terminal 100 is in a sleep state, it is turned on and the music control UI 601 is displayed by a first user gesture. Then, the screen of the second terminal 300 can become an off state or can be switched into a lock screen according to a user setting.

Figure 9:
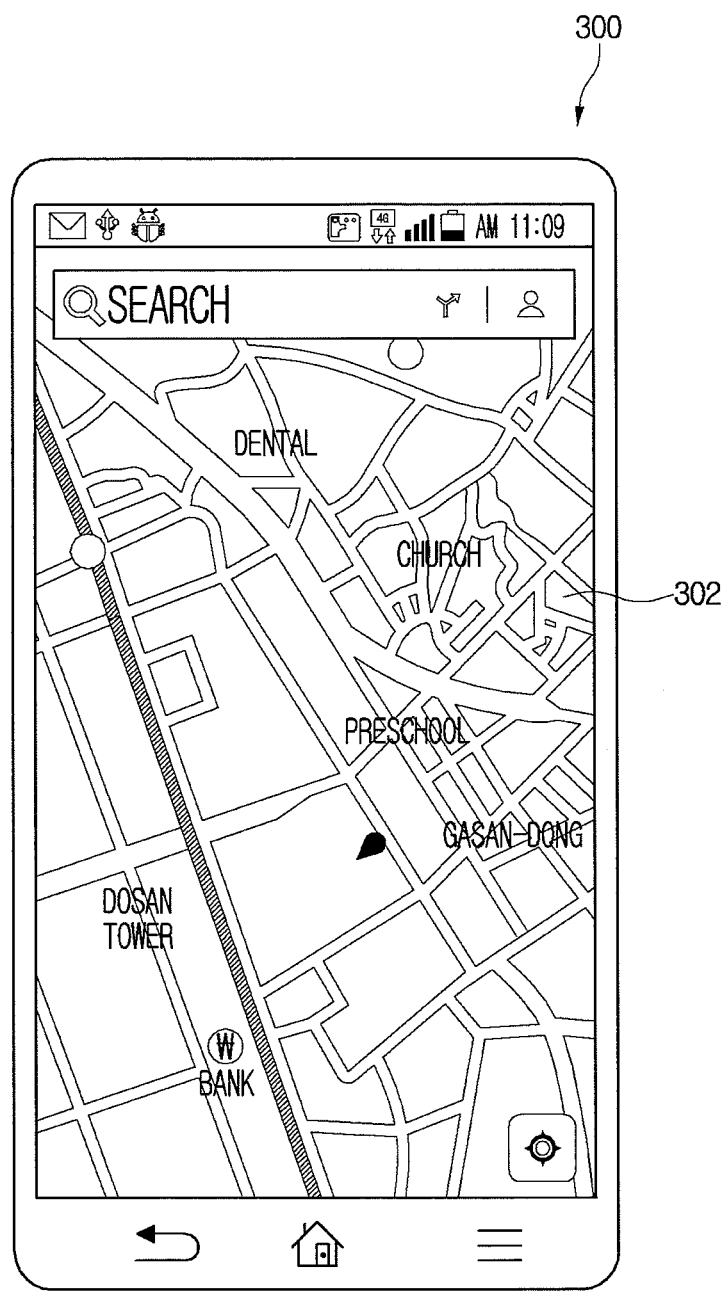
FIGS. 9 and 10 are views illustrating operations of a first terminal and a second terminal according to another embodiment of the present invention.
Figure 10:
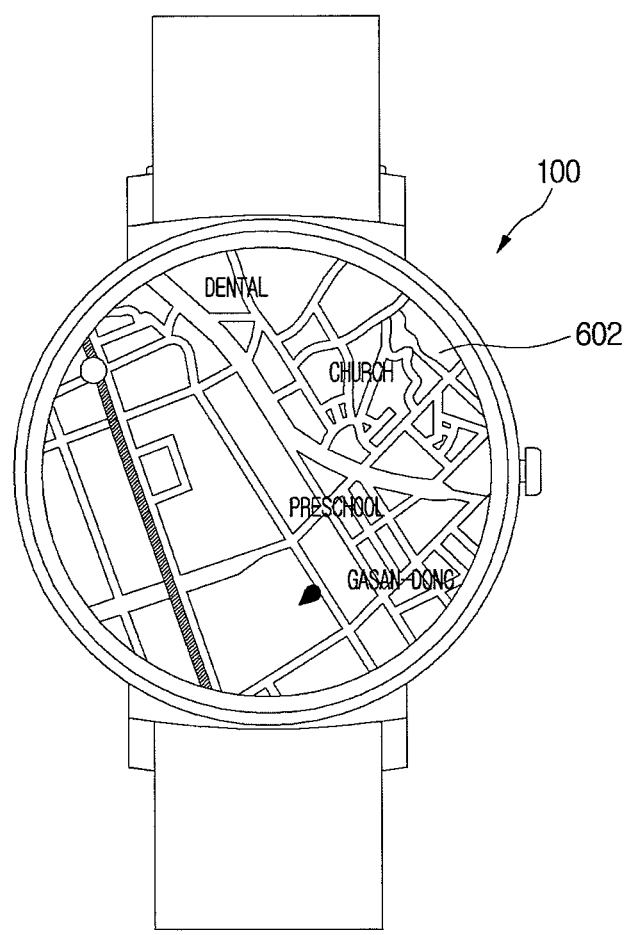

FIGS. 9 and 10 are views illustrating operations of a first terminal and a second terminal according to another embodiment of the present invention. When the first terminal 100 and the second terminal 300 shown in FIGS. 9 and 10 are worn by a user as shown in FIG. 6, a first user gesture is performed.

In this instance, the first terminal 100 detects only vibration by impact and the second terminal 300 detects vibration together with a swing movement. The second terminal 300 thus becomes a main device and the first terminal 100 becomes a sub device. Accordingly, a control for transferring all or part of operations of an application executed on the main device to the sub device is performed.

For example, as shown in FIG. 9, a map application is being executed on the second terminal 300 and a map UI 302 for a map application is displayed on the screen. Further, the screen of the first terminal 100 can be in an off or lock state. In such a case, when vibration is applied to the second terminal 300 by swinging and contacting a hand wearing the first terminal 100, all or part of operations of a map application being executed on the second terminal 300 can be transferred to the first terminal 100.

When part of operations of an application in execution is transferred as shown in FIG. 10, map information displayed by a map application being executed on the second terminal 300 is converted to correspond to the screen size of the first terminal 100 and then displayed or an enlargement map UI 602 for a partial area is displayed, on the screen of the first terminal 100.

When the screen of the first terminal 100 is in a sleep state, the screen of the first terminal 100 is turned on and the enlargement map UI 602 is displayed by a first user gesture. Then, the screen of the second terminal 300 may become an off state or can be switched into a lock screen according to a user setting.

FIGS. 11 to 14 are views illustrating operations of a first terminal and a second terminal according to another embodiment of the present invention. When the first terminal 100 and the second terminal 300 shown in FIGS. 11 to 14 are worn by a user as shown in FIG. 6, a first user gesture is performed.

In this instance, the first terminal 100 detects only vibration by impact and the second terminal 300 detects vibration together with a swing movement. The second terminal 300 becomes a main device and the first terminal 100 becomes a sub device. Accordingly, a control for transferring all or part of operations of an application executed on the main device to the sub device is performed.

Figure 11:
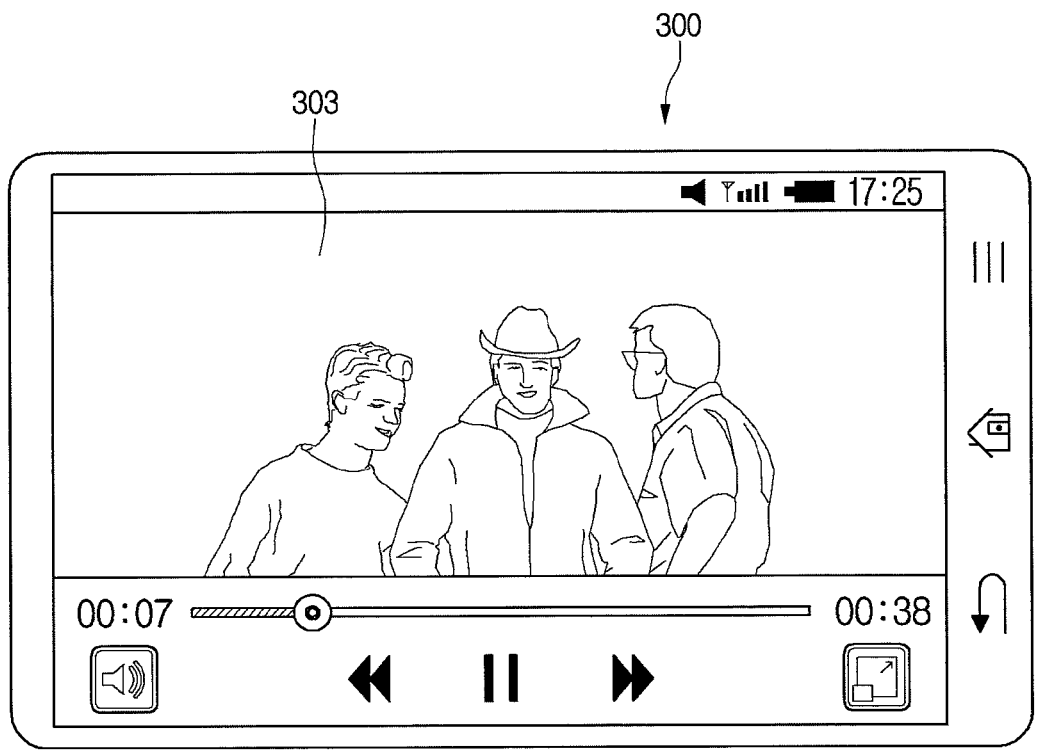
FIGS. 11 to 14 are views illustrating operations of a first terminal and a second terminal according to another embodiment of the present invention.

For example, as shown in FIG. 11, a video application is being executed on the second terminal 300 and a video/image 303 in playback is displayed on the screen. Then, the screen of the first terminal 100 can be in an off or lock state. In such a case, when vibration is applied to the second terminal 300 by swinging and contacting a hand wearing the first terminal 100, all or part of operations of a video application being executed on the second terminal 300 can be transferred to the first terminal 100.

Figure 12:
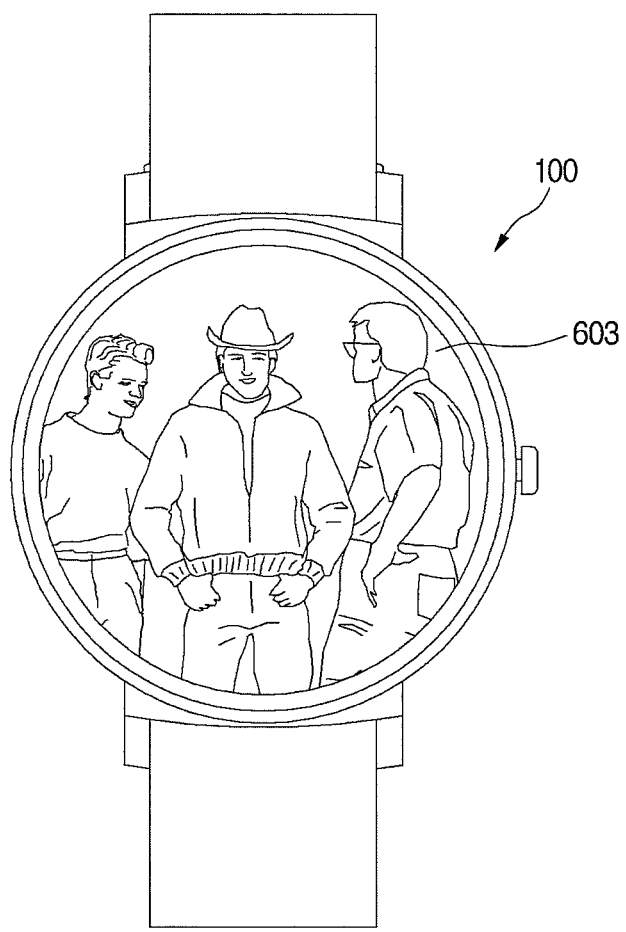
Figure 13:
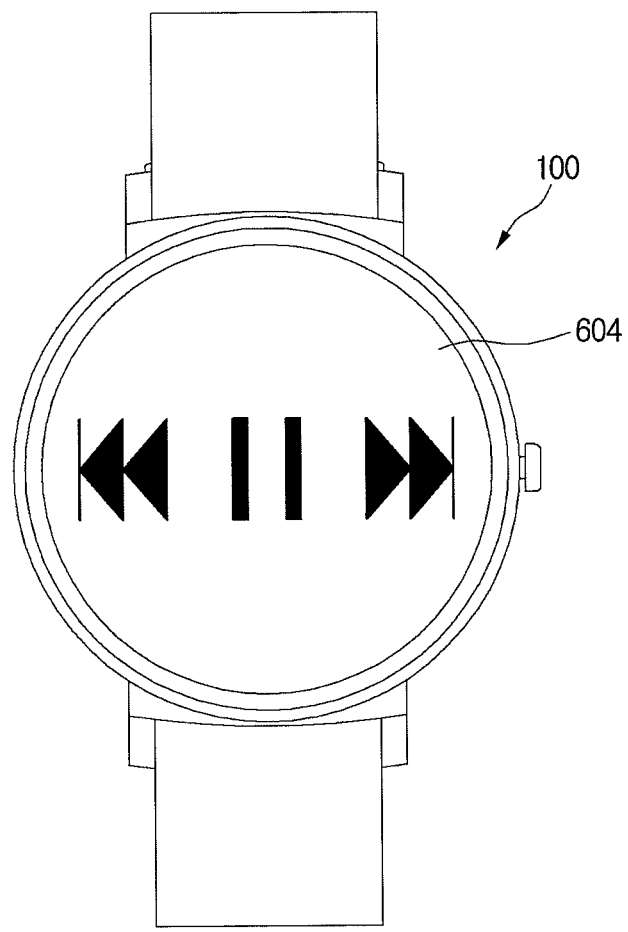
Figure 14:
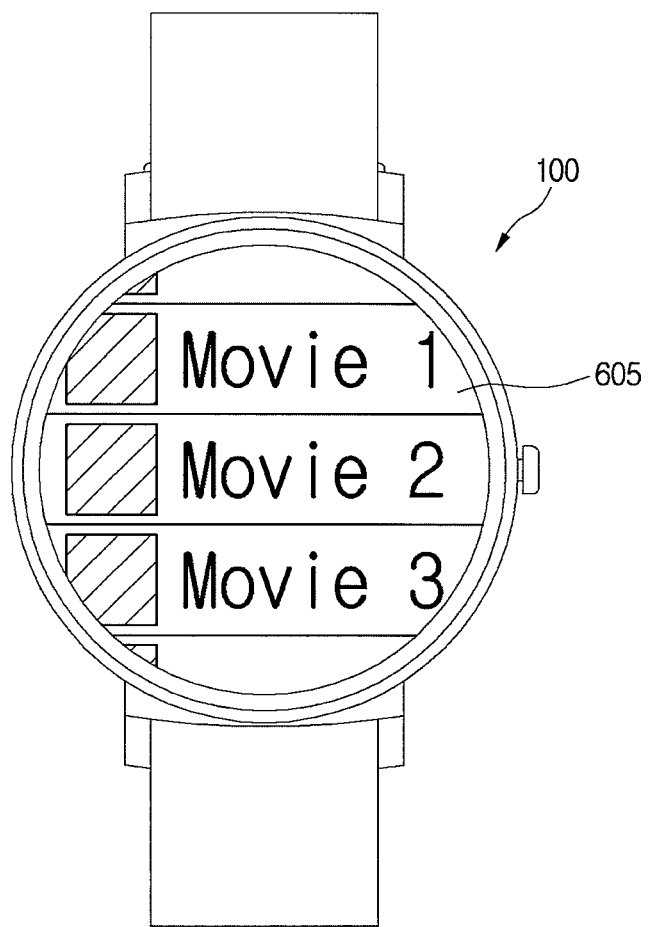

When part of operations of an application in execution is transferred as shown in FIG. 12, the image played by a video application executed on the second terminal 300 is displayed on the screen of the first terminal 100. In addition, a reduced video/image 603 is displayed on the first terminal 100 by converting a delivered image to correspond to the screen size.

That is, when the screen of the first terminal 100 is in a sleep state before a first user gesture is performed, the screen of the first terminal 100 is turned on by the first user gesture and the reduced image 603 of an image delivered from the second terminal 300 is displayed. Then, the screen of the second terminal 300 may become an off state or can be switched into a lock screen according to a user setting.

Further, a user gesture can be used as a command for transferring part of application operations or displaying a menu or a related list automatically or depending on user setting, according to application. For example, even when the first user gesture is input, a video application can be maintained on the second terminal 300 as it is and a menu UI 604 for controlling an operation of the video application can be displayed on the screen of the first terminal 100. In this instance, a user may manipulate a menu of stop, start, forward or rewind for a playback image by using the first terminal 100, while viewing an image played through the screen of the second terminal 300.

Additionally, when a video application is being executed on the second terminal 300, if a first user gesture is input, an image is continuously played on the second terminal 300 and as the screen of the first terminal 100 is waken up, an image list UI 605 of images playable through the second terminal 300 can be displayed on the image list UI 605. Whether to make a selection on a UI displayed on the first terminal 100 based on a user gesture or whether to execute an application on the second terminal 300 after a user gesture input can be additionally set by a user.

Figure 15:
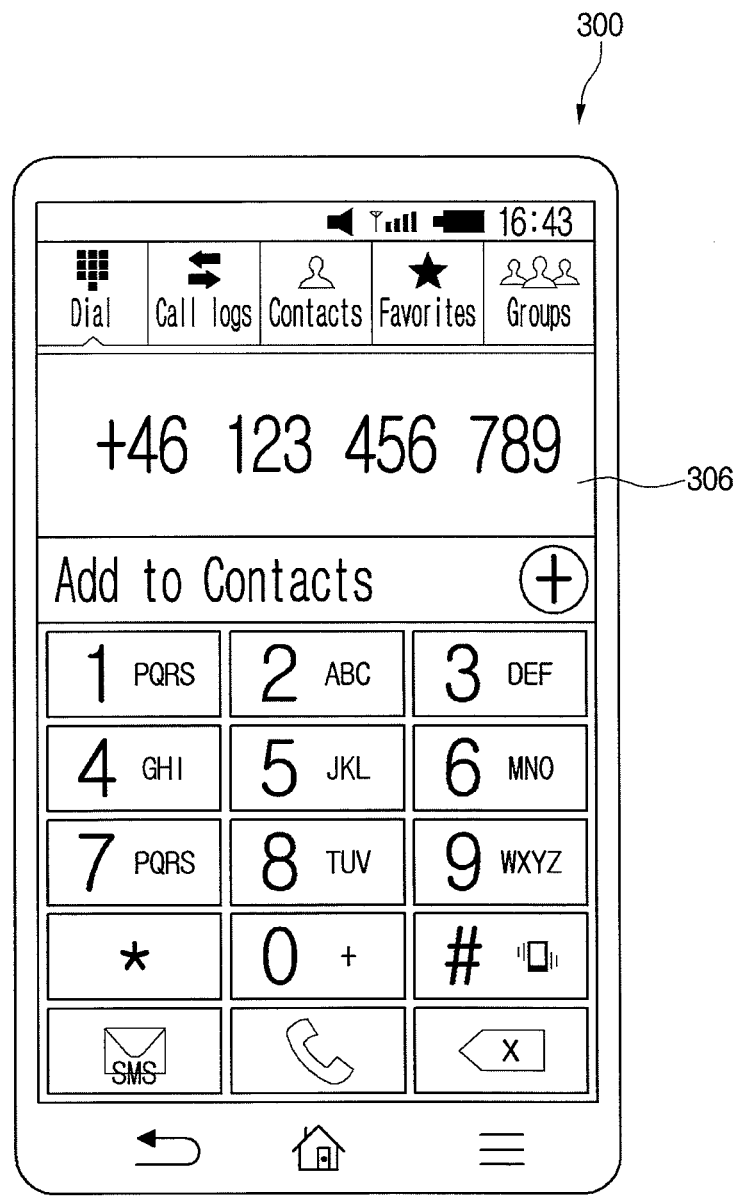
FIGS. 15 and 16 are views illustrating operations of a first terminal and a second terminal according to another embodiment of the present invention.
Figure 16:
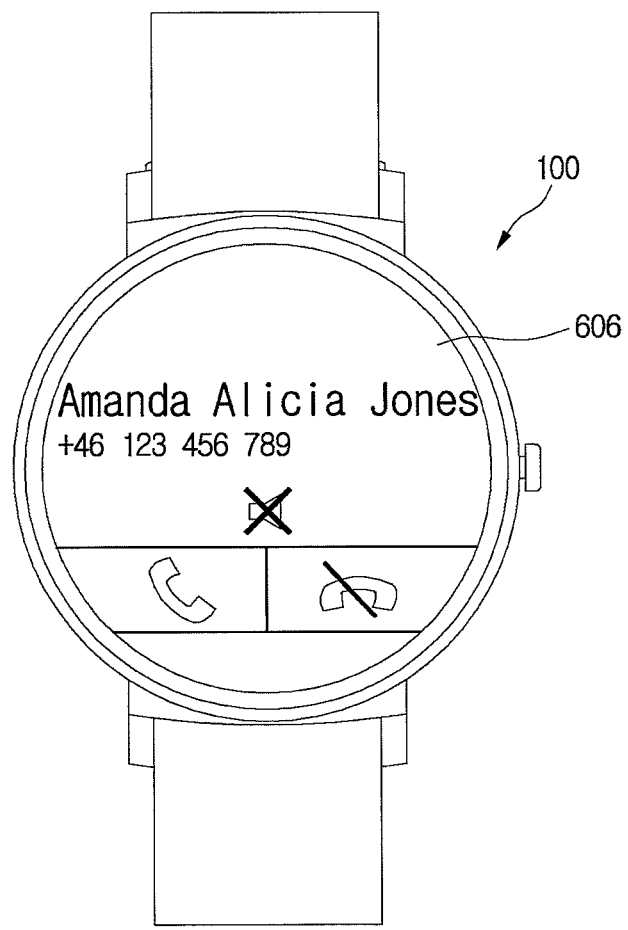

Next, FIGS. 15 and 16 are views illustrating operations of a first terminal and a second terminal according to another embodiment of the present disclosure. When the first terminal 100 and the second terminal 300 shown in FIGS. 15 and 16 are worn by a user as shown in FIG. 6, a first user gesture is performed.

In this instance, the first terminal 100 detects only vibration by impact and the second terminal 300 detects vibration together with a swing movement (for example, a movement by a predetermined distance). The second terminal 300 becomes a main device and the first terminal 100 becomes a sub device. Accordingly, a control for transferring all or part of operations of an application executed on the main device to the sub device is performed.

For example, as shown in FIG. 15, as a call application is executed on the second terminal 300 and a user inputs a phone number to a dial UI 306, if the first user gesture is received, a call menu UI 606 for allowing a user to select whether to attempt a call for the phone number input to the second terminal 300 can be displayed on the screen of the first terminal 100. The call menu UI 606 may include a menu for making a call and a menu for canceling a call.

Additionally, when the first user gesture is input after a user attempts a call by the second terminal 300, since a call signal is transmitted already, a time after call signal transmission, information on a call time with the other party, and a menu for selecting a call end can be displayed on the screen of the first terminal 100.

Figure 17:
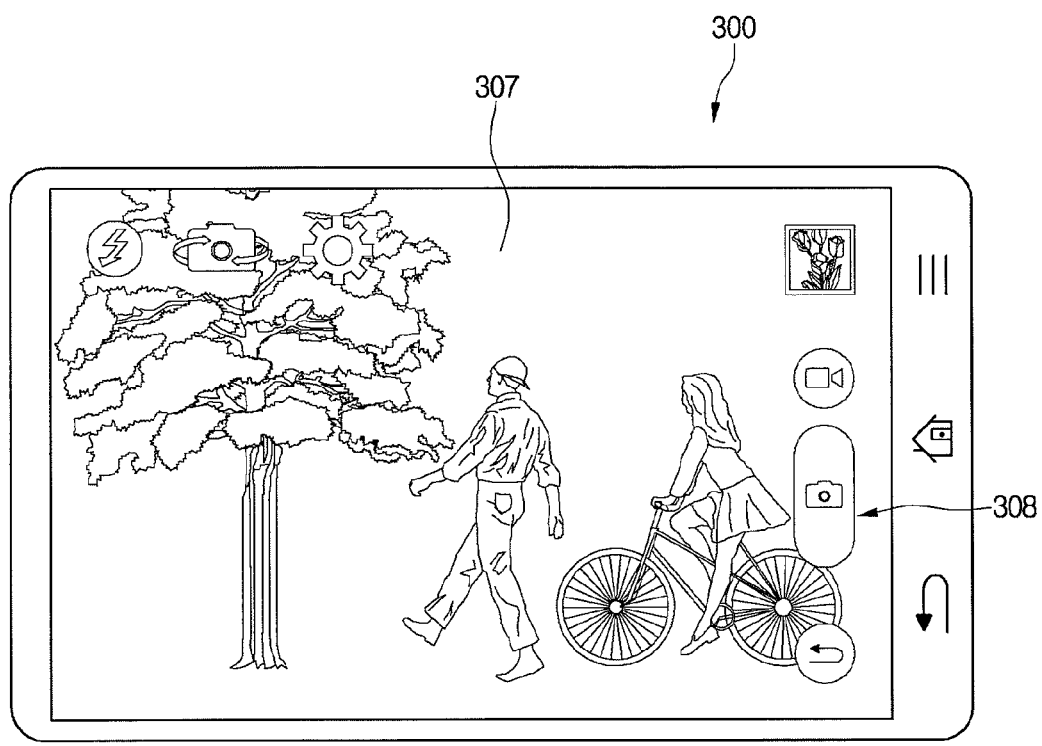
FIGS. 17 to 19 are views illustrating operations of a first terminal and a second terminal according to another embodiment of the present invention.
Figure 18:
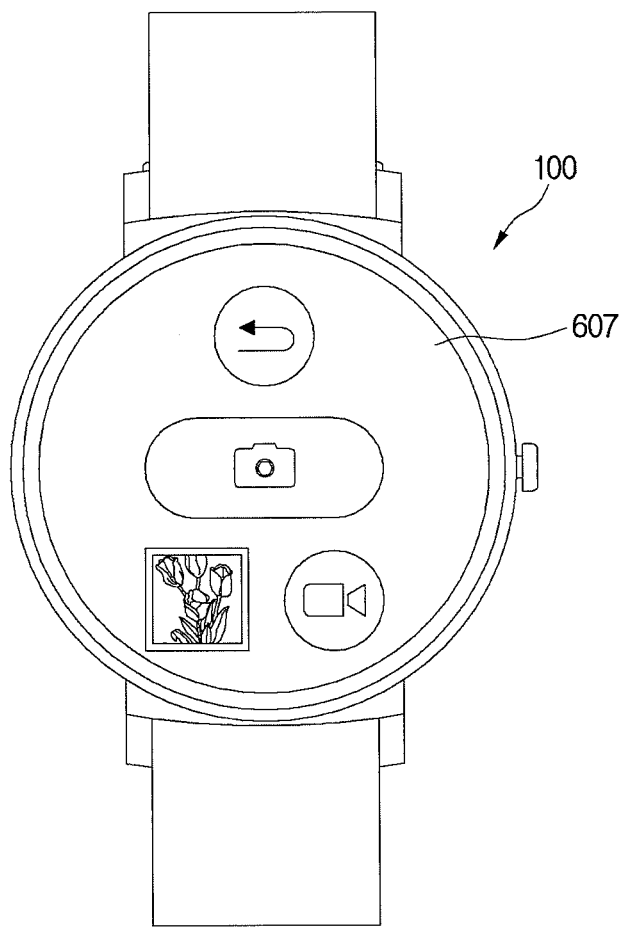

FIGS. 17 and 18 are views illustrating operations of a first terminal and a second terminal according to another embodiment of the present disclosure. When the first terminal 100 and the second terminal 300 shown in FIGS. 17 and 18 are worn by a user as shown in FIG. 6, a first user gesture is performed.

In this instance, the first terminal 100 detects only vibration by impact and the second terminal 300 detects vibration together with a swing movement. The second terminal 300 becomes a main device and the first terminal 100 becomes a sub device. Accordingly, a control for transferring all or part of operations of an application executed on the main device to the sub device is performed.

For example, as shown in FIG. 17, when a camera application is being executed on the second terminal 300 and a user wants to take a picture of an object, an object image 307 that is a capturing target is displayed on the screen of the second terminal 300 and at least one menu UI 308 is displayed. Herein, the menu UI 308 may include a picture capturing button, a video capturing button, and a gallery check button.

While a camera application is executed through the second terminal 300, if a first user gesture is input, all or part of items relating to operations of the camera application is transferred to the first terminal 100. For example, as shown in FIG. 18, the screen of the first terminal 100 is activated and the menu UI 607 provided for operations of the camera application can be displayed thereon. Through such an operation, a user can remotely manipulate picture capturing or video capturing by manipulating the first terminal 100 at a location distant from the second terminal 300.

Figure 19:
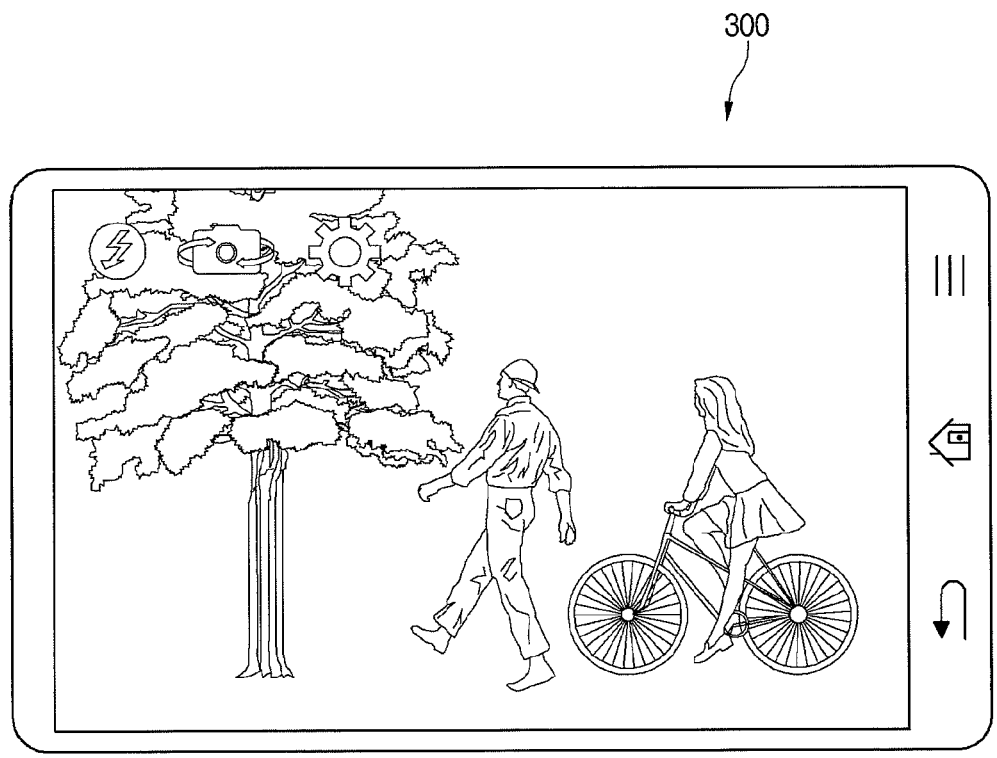

Moreover, when a camera application is executed on the second terminal 300, as an application operation is transferred in correspondence to a first user gesture, by displaying no menu UI 308 provided to the screen of the second terminal 300, a user may easily check that the camera application is controlled by the first terminal 100. When a menu for controlling an operation of a camera application is provided to the first terminal 100, as shown in FIG. 19, only an image of an object that is a capturing target can be displayed on the second terminal 300.

Figure 20:
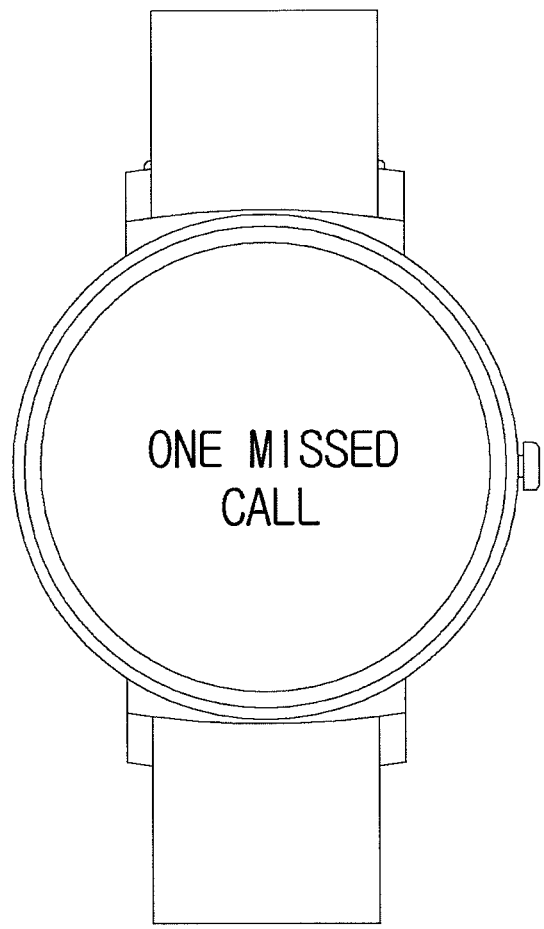
FIGS. 20 to 22 are views illustrating operations of a first terminal according to another embodiment of the present invention.
Figure 21:
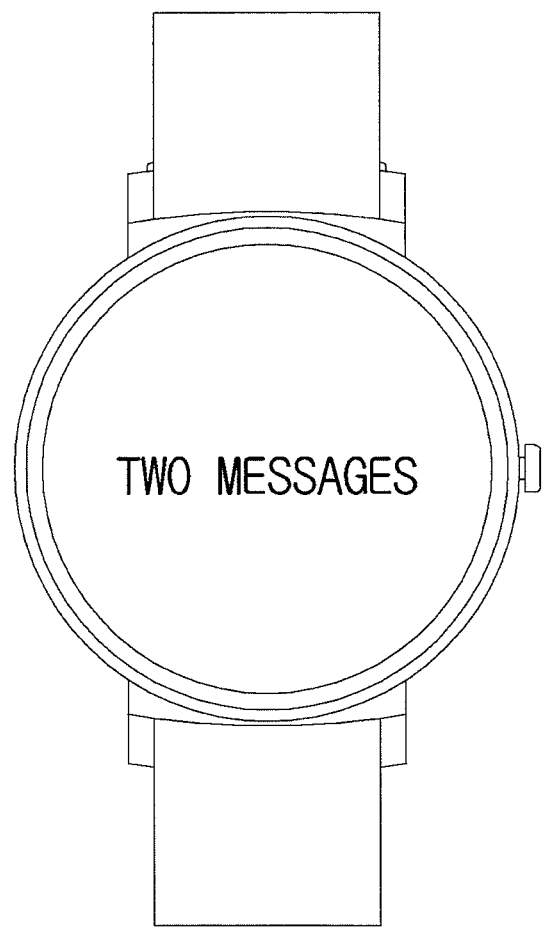
Figure 22:
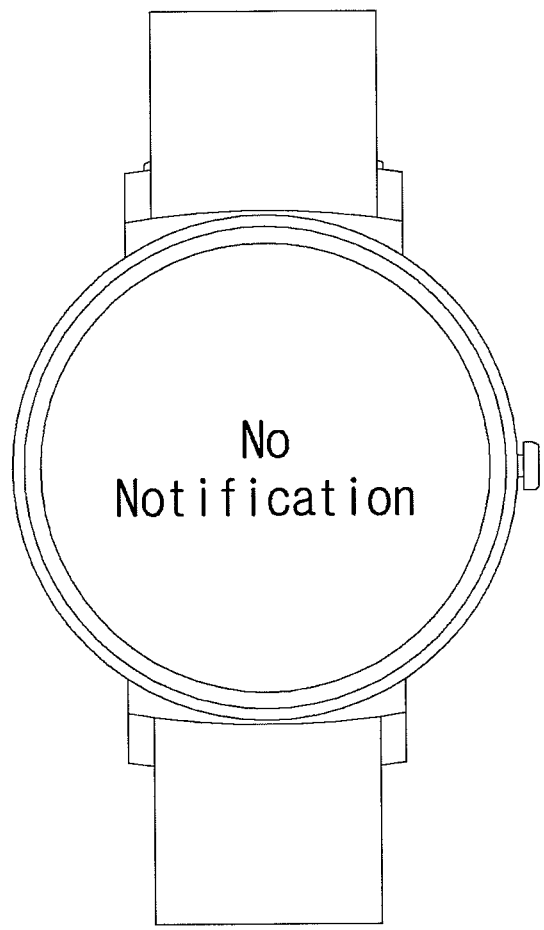

FIGS. 20 to 22 are views illustrating operations of a first terminal according to another embodiment of the present invention. In the above embodiments, it is described that when a specific application is executed on the second terminal, an operation or menu relating to a corresponding application is transferred to the first terminal.

However, according to an embodiment of the present disclosure, although a first user gesture shown in FIG. 6 is input, an application may not be executed on the second terminal by a user. Even when a screen off/on state of each of the first terminal and the second terminal and information on an application in execution are transmitted/received between the first terminal and the second terminal and the first user gesture is input, if there is no application executed on the second terminal set as a main device, whether there is a pushed notification message in the second terminal can be checked.

For example, when the first user gesture is input, the second terminal may transmit information arriving by push notification to the first terminal. For example, when there is one missed call on the second terminal and a user does not check the call yet, as a result of a first user gesture, corresponding notification information is transmitted to the first terminal and as shown in FIG. 20, as the screen of the first terminal is on, the corresponding notification information can be displayed thereon.

Accordingly, while the screens of the first terminal and the second terminal are turned off, a user may easily check whether there is notification information and notification content from the screen of the first terminal through the user gesture shown in FIG. 6. If notification information in the second terminal is a message, content can be displayed on the screen of the first terminal as shown in FIG. 21 and if there is no notification information in the second terminal, whether or not there is notification information can be displayed on the screen of the first terminal as shown in FIG. 22.

Through such a method, a user may use the first terminal and the second terminal mutually and dynamically, and the first terminal convenient for carrying and the second terminal capable of displaying a large amount of information may interoperate smoothly.

Figure 23:
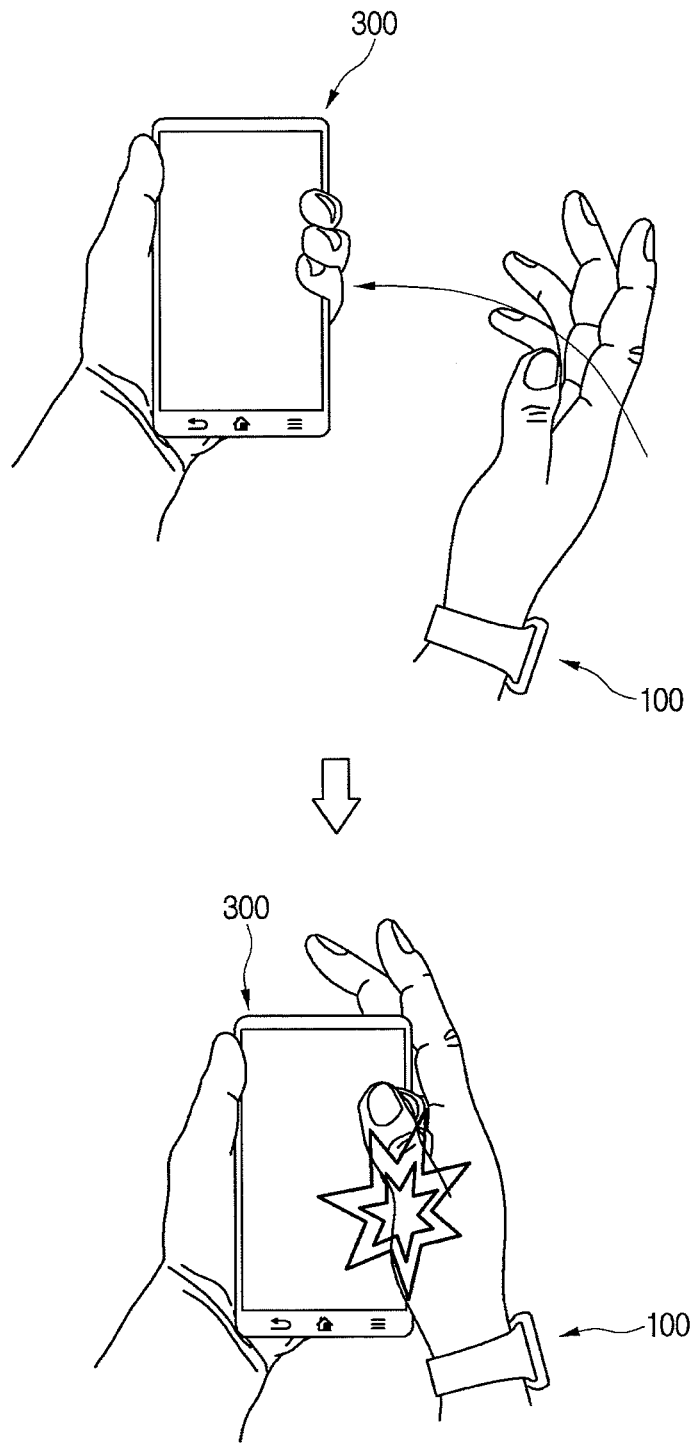
FIG. 23 is a view illustrating a gesture taken by a user through first and second terminals according to an embodiment of the present invention.

FIG. 23 is a view illustrating a gesture taken by a user through first and second terminals according to another embodiment of the present invention. As mentioned above, the first terminal 100 refers to a wearable device such as a watch type device and the second terminal 300 refers to a handheld type smartphone. According to the description, it is simply referred to as a watch type device or a wearable device.

When a smartphone (for example, the second terminal) and a watch type terminal (for example, the first terminal) are used together, the second terminal can be gripped by a hand wearing the first terminal or the first terminal and the second terminal can be worn on different hands. In each case, an application operation can be determined between terminals according to a gesture taken by a user. Herein, a gesture taken by a user can be a gesture for bumping to the second terminal 300 by swinging the first terminal 100 while maintaining the position of the second terminal 300 as shown in FIG. 23.

That is, the second terminal 300 detects vibration by a sensor unit and the first terminal 100 detects a swing motion indicating a predetermined distance movement and vibration by a sensor unit. Such a user gesture can be referred to as a second user gesture. In this instance, a main device that is a subject for transferring all or part of operations or menu of an application in execution can be the first terminal 100 and a sub device that is a subject for receiving a corresponding operation or menu and displaying it on the screen can be the second terminal 200.

In comparison to the above-mentioned first user gesture, for the second user gesture, since whether the first terminal and the second terminal operate as a main device and a sub device is changed, the embodiments of FIGS. 17 to 19 can be implemented in the reversal manner. It is apparent that the above-mentioned embodiments can be applied to a user gesture of FIG. 23 in the reversal manner and other embodiments are described additionally.

Figure 24:
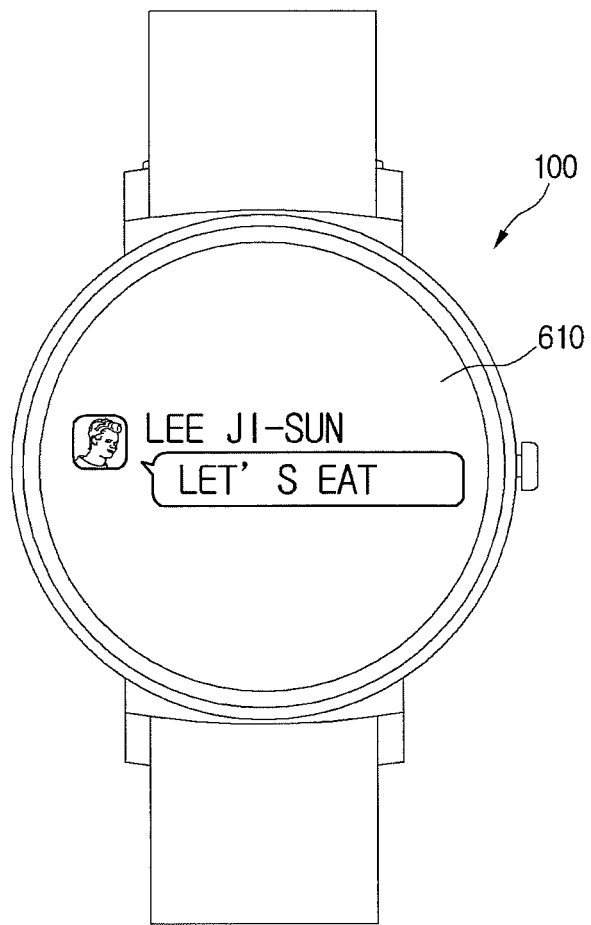
FIGS. 24 and 25 are views illustrating operations of a first terminal and a second terminal according to another embodiment of the present invention.
Figure 25:
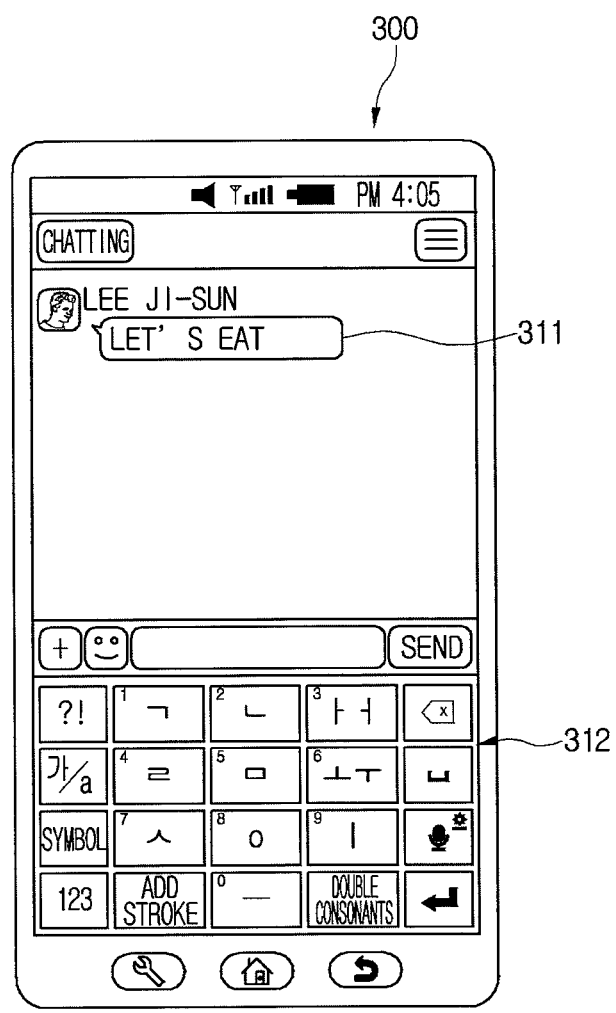

FIGS. 24 and 25 are views illustrating operations of a first terminal and a second terminal according to another embodiment of the present disclosure. When the first terminal 100 and the second terminal 300 shown in FIGS. 24 and 25 are worn by a user as shown in FIG. 23, a second user gesture is performed.

In this instance, the second terminal 300 detects vibration due to impact and the first terminal 100 detects vibration together with a swing motion (for example, a movement by a predetermined distance). Then, the first terminal 100 becomes a main device and the second terminal 300 becomes a sub device. Accordingly, a control for transferring all or part of operations of an application executed on the main device to the sub device is performed.

As shown in FIG. 24, when a message notification is displayed on the first terminal 100 is used as an example. When the first terminal 100 and the second terminal 300 are connected to each other in order for data transmission/reception, notification information received by the second terminal 300 can be displayed on the screen of the first terminal 100. That is, a user can check push information such as a message that the second terminal 300 receives through the screen of the first terminal 100 at a predetermined distance away from the second terminal 300.

For example, the nickname or name of a user who transmits a message as push information on a message application and corresponding message content can be displayed on the screen of the first terminal 100 briefly. In addition, when replying the received message, the user may prefer a text input through the large size screen of the second terminal 300 to a text input through the small size screen of the first terminal 100.

In addition, when a user inputs a second user gesture, as shown in FIG. 25, a corresponding application is executed on the second terminal 300 and a message 311 received as notification and a virtual keyboard 312 for allowing a user input a reply for the message are displayed. Although such an operation could be seen that part of operations or menu of an application is transferred to a sub device, it can be said that the second terminal 300 becomes an auxiliary device of the first terminal 100. From such a perspective, when specific information is displayed on the screen of the first terminal 100, embodiments in which corresponding information and related information are checked through the screen of the second terminal 300 can be devised.

Figure 26:
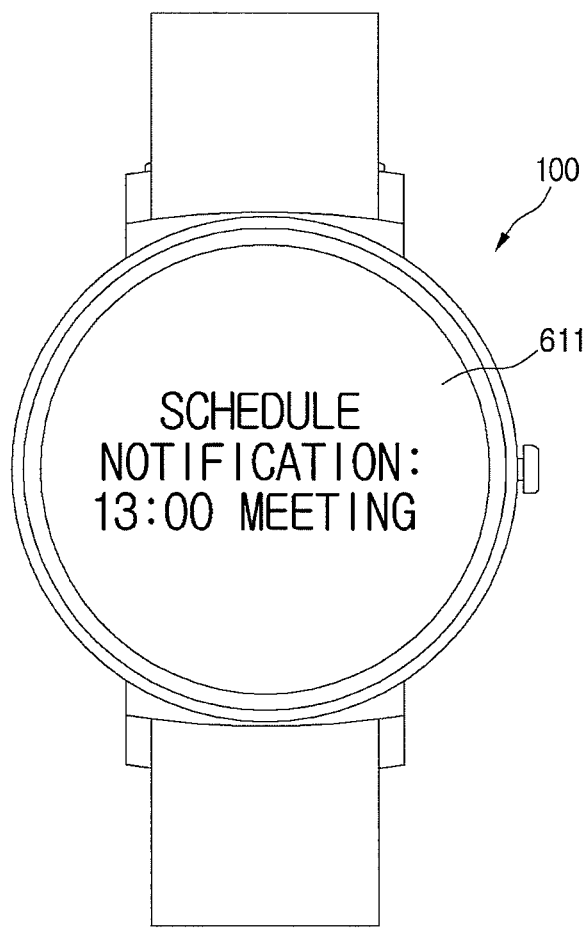
FIGS. 26 and 27 are views illustrating operations of a first terminal and a second terminal according to another embodiment of the present invention.
Figure 27:
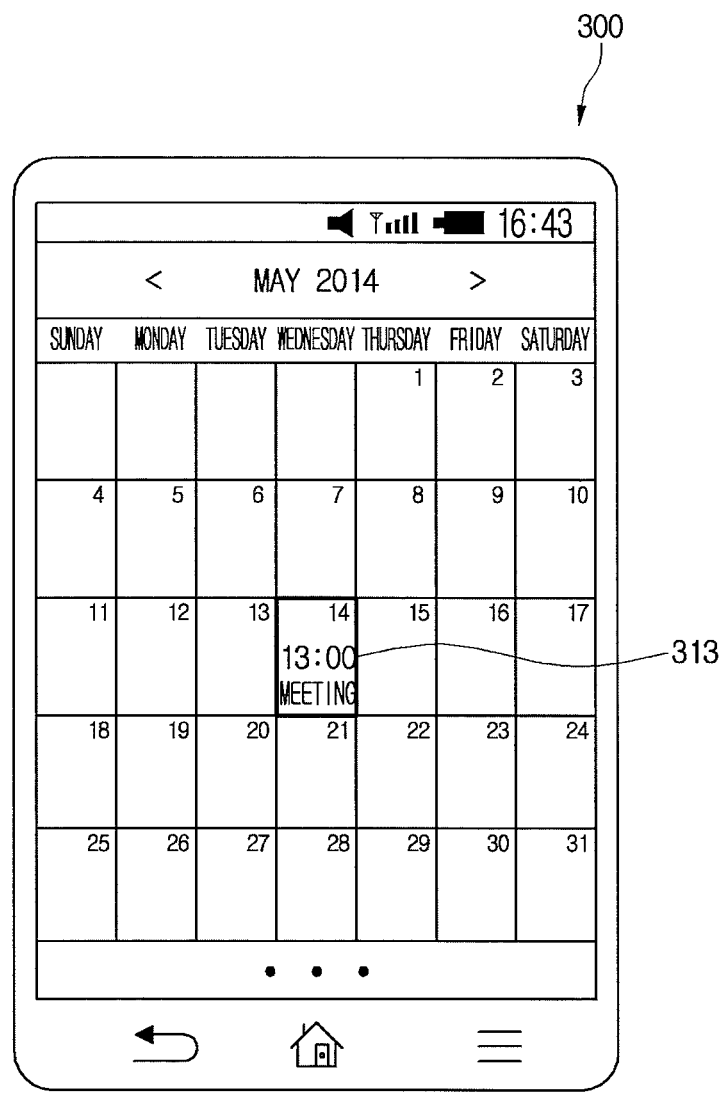

FIGS. 26 and 27 are views illustrating operations of a first terminal and a second terminal according to another embodiment of the present disclosure. When the first terminal 100 and the second terminal 300 shown in FIGS. 26 and 27 are worn/carried by a user as shown in FIG. 23, a second user gesture is performed.

In this instance, the second terminal 300 detects vibration due to impact and the first terminal 100 detects vibration together with a swing motion (for example, a movement by a predetermined distance). Then, the first terminal 100 becomes a main device and the second terminal 300 becomes a sub device. Accordingly, a control for transferring all or part of operations of an application executed on the main device to the sub device is performed.

As shown in FIG. 26, notification information 611 representing an event occurring from a predetermined application can be displayed on the screen of the first terminal 100. For example, the notification information 1611 may include time information relating to a schedule and content of a corresponding schedule. In addition, when wanting to check the content of a corresponding schedule in more detail or check it together with the schedules of other dates, a user may require a schedule check and input through the large screen of the second terminal 300 other than the small screen of the first terminal 100.

When a user inputs a second user gesture, as shown in FIG. 27, a corresponding schedule related application is executed on the second terminal 300, an item 313 for a corresponding schedule transmitted as notification is displayed, and date specified schedules can be displayed in a calendar form together.

Figure 28:
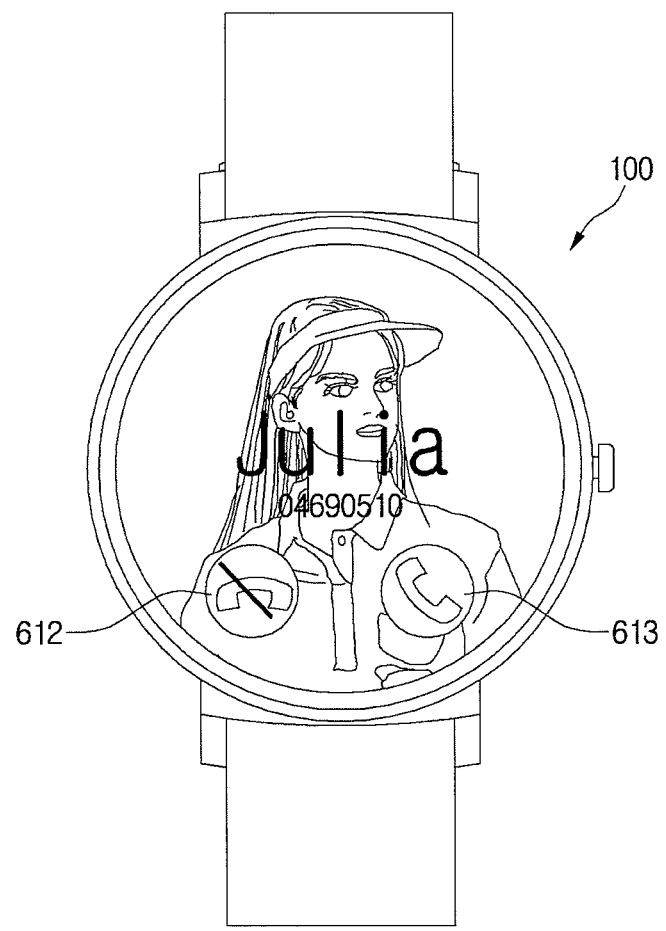
FIGS. 28 and 29 are views illustrating operations of a first terminal and a second terminal according to another embodiment of the present invention.
Figure 29:
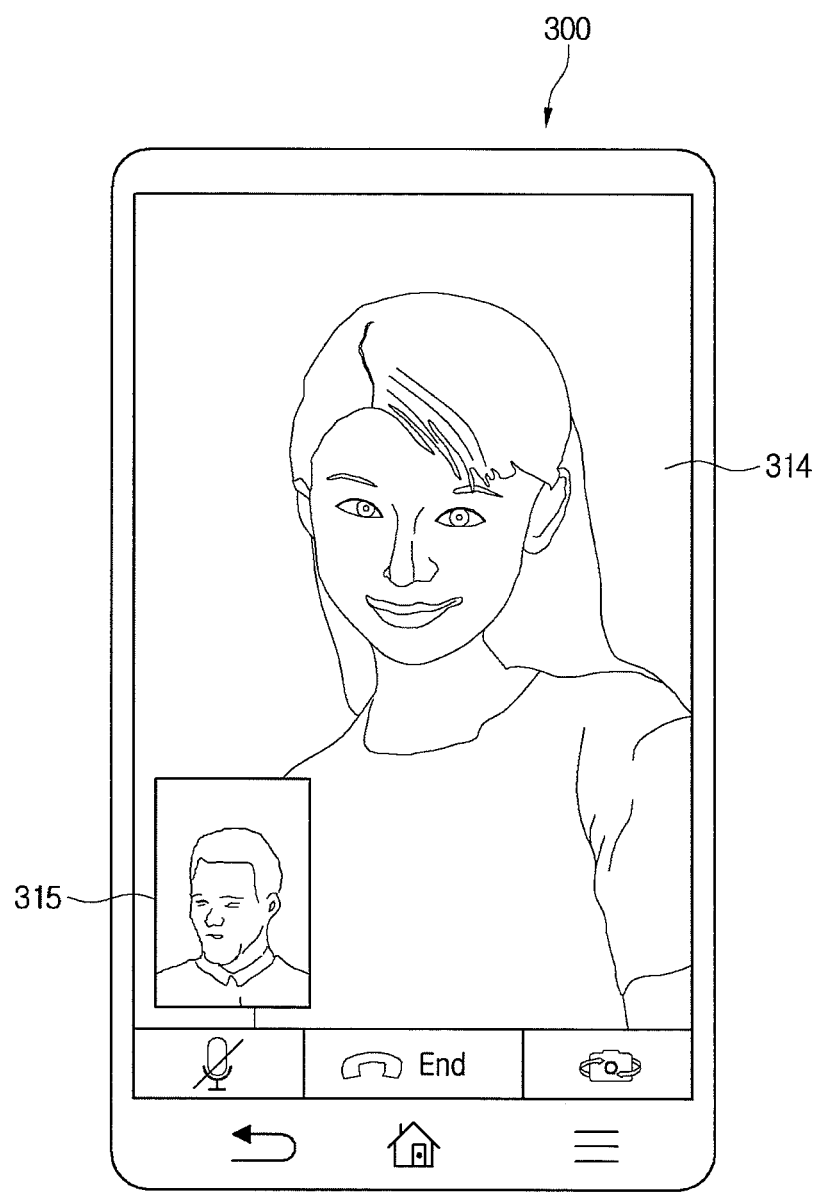

FIGS. 28 and 29 are views illustrating operations of a first terminal and a second terminal according to another embodiment of the present disclosure. When the first terminal 100 and the second terminal 300 shown in FIGS. 28 and 29 are worn/carried by a user as shown in FIG. 23, a second user gesture is performed.

In this instance, the second terminal 300 detects vibration due to impact and the first terminal 100 detects vibration together with a swing motion (for example, a movement by a predetermined distance). Then, the first terminal 100 becomes a main device and the second terminal 300 becomes a sub device. Accordingly, a control for transferring all or part of operations of an application executed on the main device to the sub device is performed.

When a notification of a reception call is displayed through the first terminal 100, a call notification received by the second terminal 300 can be displayed on the screen of the first terminal 100. In this embodiment, when notification information with respect to a reception call of the second terminal 300 is displayed on the screen of the first terminal 100, if a second user gesture is input, a connection of a video call can be performed according to user setting through the second terminal 300.

While a call reception notification with respect to a reception call of the second terminal 300 is displayed on the screen of the first terminal 100, if a user selects a call reception button 612 displayed on the screen of the first terminal 100, a voice call is connected. Then, when a voice call with the other party is connected, if a second user gesture is input, a voice call can be continuously performed through the second terminal 300.

Further, while a call reception notification with respect to a reception call of the second terminal 300 is displayed on the screen of the first terminal 100, if a second user gesture is input, it is received as a command for performing a video call using the second terminal 300 and the screen and the camera of the second terminal 300 are activated. In addition, as shown in FIG. 29, the other party image 314 and an image 315 of a user of the second terminal 300 can be displayed on a screen of the second terminal 300.

Moreover, according to a user setting, a video call is not connected but as a voice call is connected, a speaker phone call connection can be made through the second terminal. In the above-mentioned embodiments, various embodiments under the assumption that a user holds the second terminal by one hand and wears the first terminal by one hand are described. However, according to an embodiment of the present invention, it is assumed that a user wears the first terminal by one hand and grips the second terminal by a corresponding hand.

Figure 30:
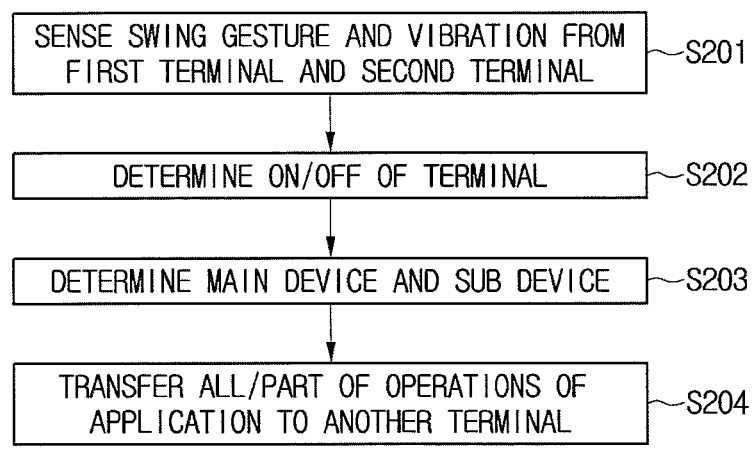
FIG. 30 is a flowchart illustrating operations performed between terminals according to a gesture occurring between a first terminal and a second terminal according to an embodiment of the present invention.

FIG. 30 is a flowchart illustrating operations performed between terminals according to a gesture occurring between a first terminal and a second terminal according to an embodiment of the present invention. Referring to FIG. 30, the first terminal and the second terminal can be connected to each other for mutual communication and may detect a swing gesture, a vibration gesture, and positions in vertical and horizontal directions by a sensor unit in each thereof.

The first terminal and the second terminal recognize a gesture applied by a user and determine whether the recognized gesture is a command for requesting all or part of application operations in execution currently to be transferred to another terminal. For example, when a swing gesture and a vibration are detected by the first terminal and the second terminal in operation S201, a predetermined gesture can be provided. In this instance, when a user wears the first terminal by one hand and grips the second terminal by the same hand, a movement is made by a predetermined angle or distance or shaking is provided.

Such a gesture is defined as a third user gesture and when the third user gesture is input, each of the first and second terminals determines whether the screen of the other party device is turned on or off in operation S202. Then, when the screen of one terminal is in a turn off state, a corresponding device can be determined as a sub device and a device having a screen in a turn on state can be determined as a main device in operation S203. As another example, it is possible to determine whether there is an application executed between the first and second terminals or determine a main device and a sub device according to the type of an application in execution.

When a main device and a sub device are determined between the first terminal and the second terminal, all or part of operations of an application being executed in the main device can be transferred to the sub device in operation S204.

Figure 31:
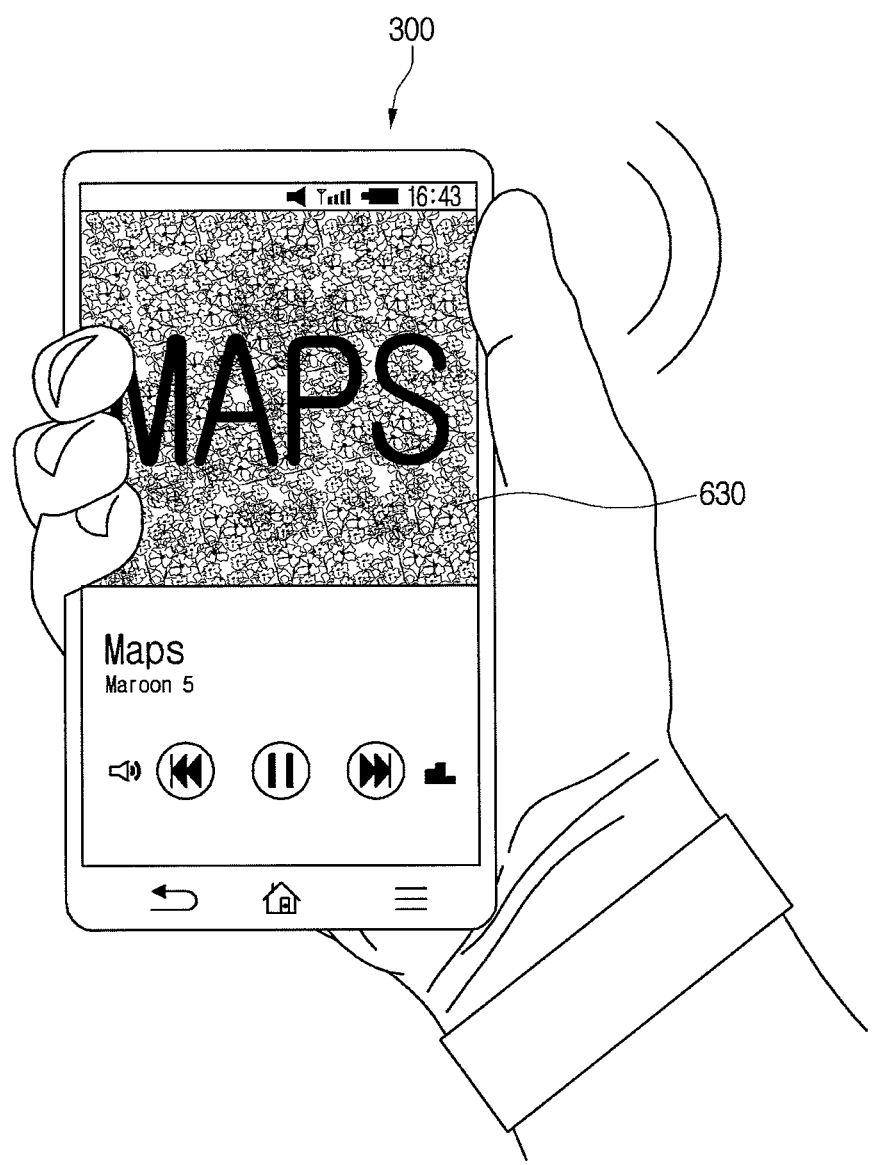
FIGS. 31 and 32 are views illustrating operations of a first terminal and a second terminal according to another embodiment of the present invention.
Figure 32:
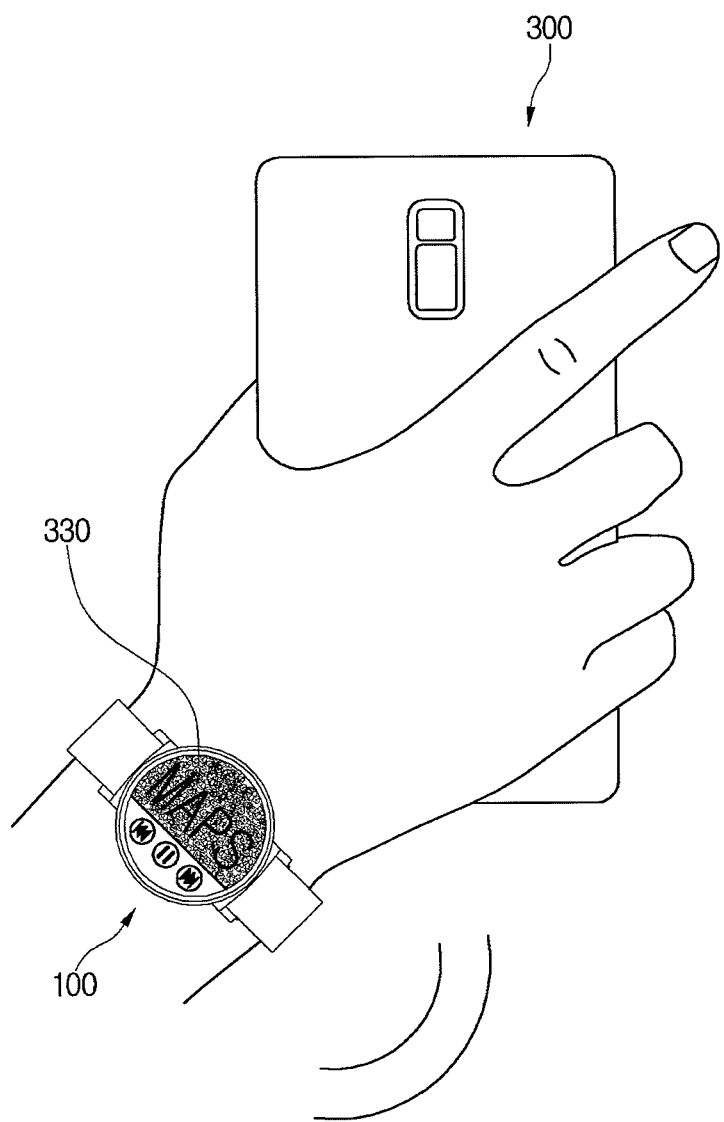

FIGS. 31 and 32 are views illustrating operations of a first terminal and a second terminal according to another embodiment of the present disclosure. Operations of a terminal according to this embodiment, as shown in FIG. 31, are operations for moving the second terminal in a grip state horizontally or vertically by a hand wearing the first terminal. This user gesture can be referred to as a third user gesture.

When a user shakes the first terminal 100 and the second terminal 300, all or part of operations of an application being executed in the second terminal 300 can be transferred to the first terminal 100. For example, a UI relating to a menu for manipulating operations of an application being executed on the second terminal 300 can be transferred to the first terminal 100 or all or part of images displayed on the second terminal 300 can be displayed on the first terminal 100.

In addition, if the screen of the first terminal 100 is turned off, the screen of the first terminal 100 is turned on according to a user's function transfer gesture and the screen of the second terminal 300 becomes turned off according to user setting or the screen can be maintained in a turn on state in order for continuous operations of an application.

When a music application is being executed on the second terminal 300, according to a user gesture, as shown in FIG. 31, a menu UI 330 for manipulating the music application can be displayed on the screen of the first terminal 100. Then, due to a function transfer operation between the terminals, the playback of music can be also transferred from the second terminal 300 to the first terminal 100.

When the screen of the first terminal 100 is turned off and the two terminals 100 and 300 are disposed within a predetermined distance, if the first and second terminals 100 and 300 are shaken together or vibration is applied to them, the second terminal 300 may deliver all or part of operations of an application being executed on the second terminal 300 to the first terminal 100.

Then, as the screen of the first terminal 100 is waken up, all or part of operations of an application being executed on the second terminal 300 can be executed. For example, if a music application is being executed on the second terminal 300, information on playback music and a menu 330 for setting playback can be displayed on the screen of the first terminal 100. Further, when the screen of the second terminal 300 is in a turn off state or a sleep state and if an application is being executed when the screen of the first terminal 100 is turned on, all or part of operations/functions of an application executed between the terminals can be transferred.

Figure 33:
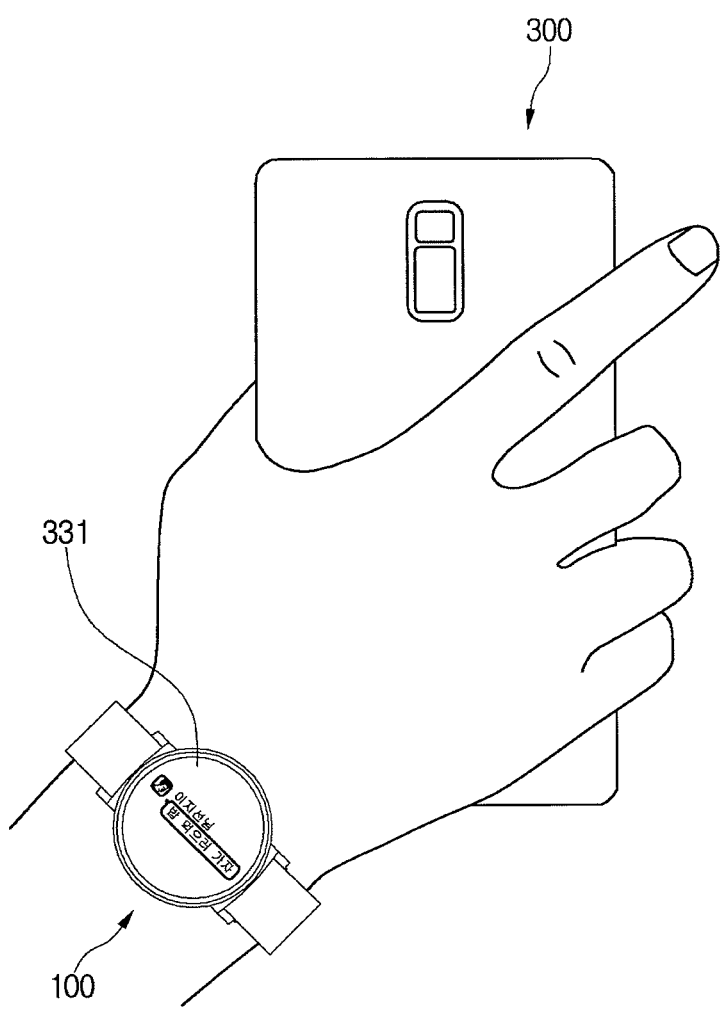
FIGS. 33 and 34 are views illustrating operations of a first terminal and a second terminal according to another embodiment of the present invention.
Figure 34:
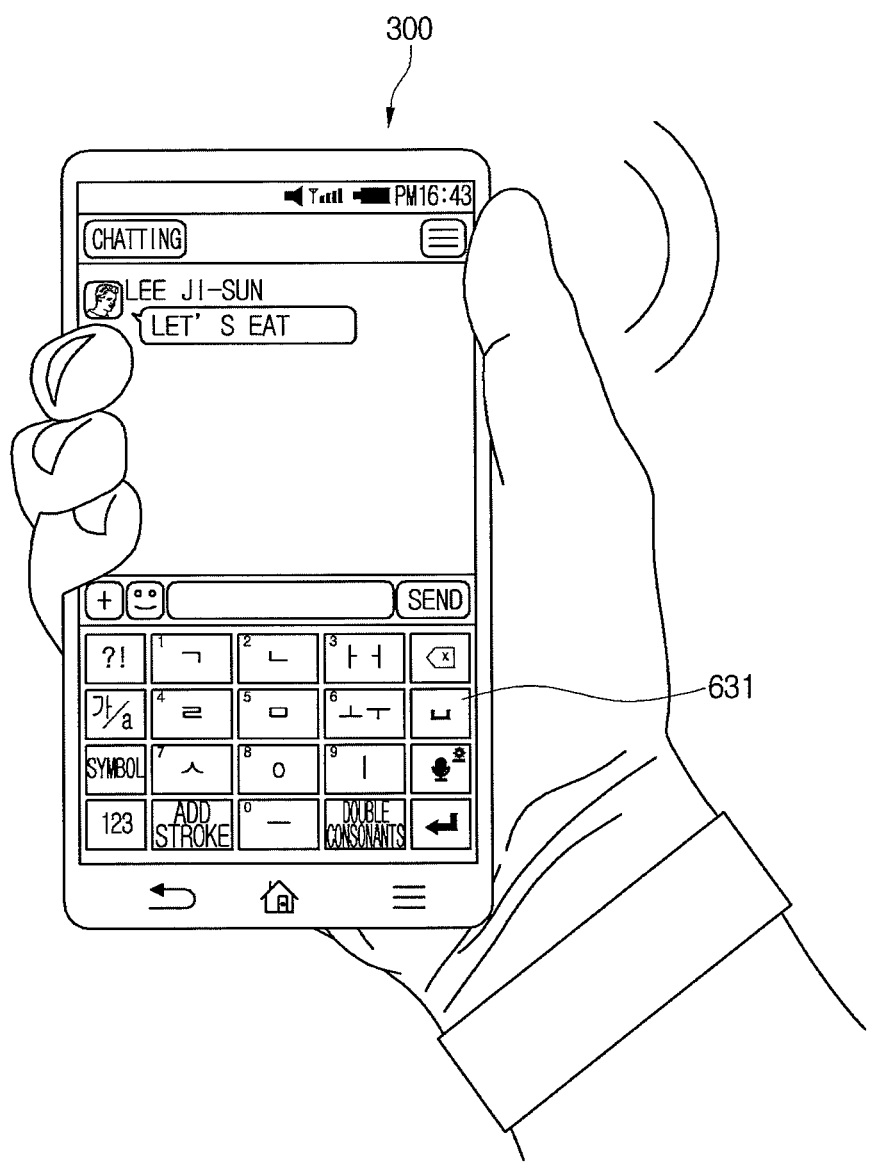

FIGS. 33 and 34 are views illustrating operations of a first terminal and a second terminal according to another embodiment of the present disclosure. The embodiment shown in FIGS. 33 and 34 is a case that the above-mentioned third user gesture is input. When a notification is received through the first terminal 100 worn on a user's wrist and a corresponding notification is a message reception through a messenger application, all or part of corresponding message content can be displayed on the screen of the first terminal 100.

Then, when a user wants to reply to the received message, as applying or shaking the second terminal 300 in a state of gripping the second terminal 300, all or part of operations of an application being executed on the first terminal 100 can be transferred to the second terminal 300. Through such an application operation transfer, an operation of a messenger application performed by the first terminal 100 is transferred to the second terminal 300, and together with a corresponding messenger application executed on the second terminal 300, a virtual keyboard 631 for message reply can be displayed on the second terminal 300.

For example, a message notification is displayed on the screen of the first terminal 100 through a message notification UI 331 and an application for a corresponding message can be displayed on the screen of the second terminal 300 through a message UI. Through such a process, a terminal in a sleep state is waken up while various applications are executed on the first terminal 100 or the second terminal 300 and such a wake up operation includes transferring all or part of operations/functions of an application in execution.

In the above-mentioned embodiments, it is described mainly that a main device and a sub device are automatically set between the first terminal and the second terminal and accordingly, all or part of items relating to an operation of an application in execution is transferred to the sub device.

However, even when a main device and a sub device are determined according to a user gesture between the first terminal and the second terminal, an application and an operation, that is, transfer targets, can be inappropriate or may not exist. For example, when both the first terminal and the second terminal are in a sleep state, there can be a standby state in which a specific application is not executed. However, since the first terminal or the second terminal receives notification information relating to a specific application in such a standby state, such notification information can be delivered between the first terminal and the second terminal. Additionally, according to a user gesture, one of the first terminal and the second terminal can be used as an auxiliary device.

Figure 35:
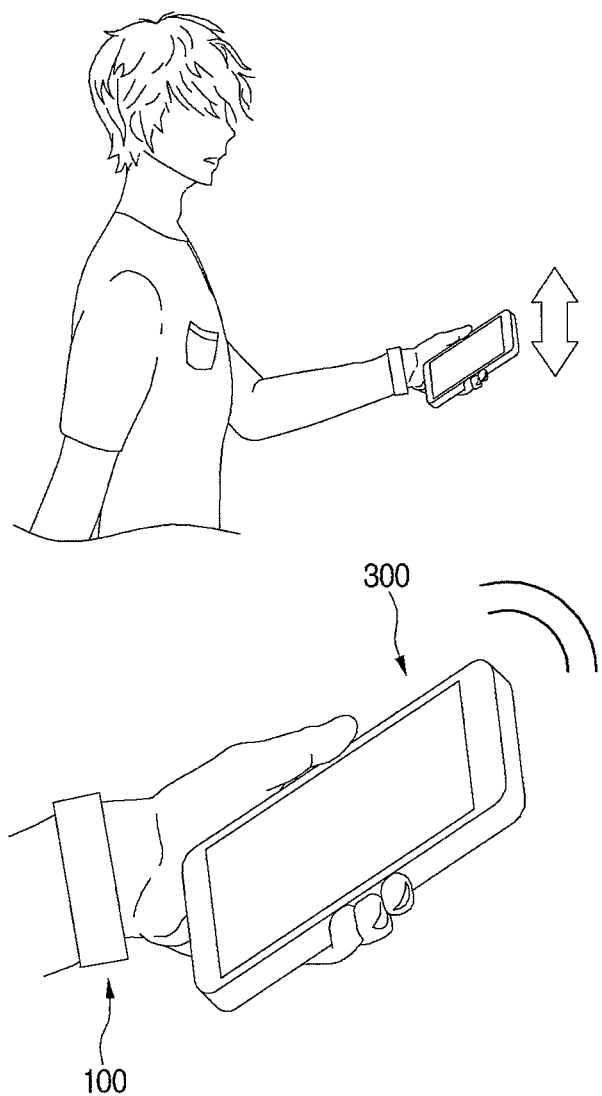
FIGS. 35 and 36 are views illustrating a fourth user gesture according to an embodiment of the present invention and FIGS. 37 and 38 are views illustrating a fifth user gesture according to an embodiment of the present invention.
Figure 36:
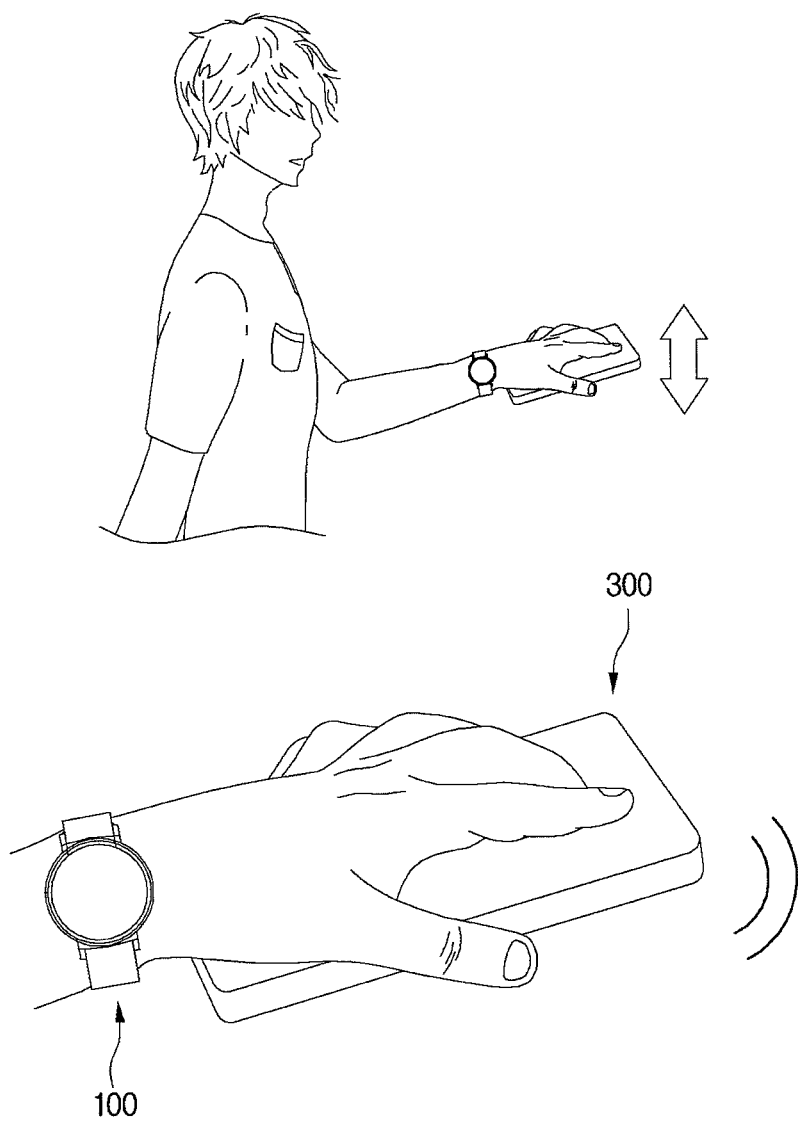
Figure 37:
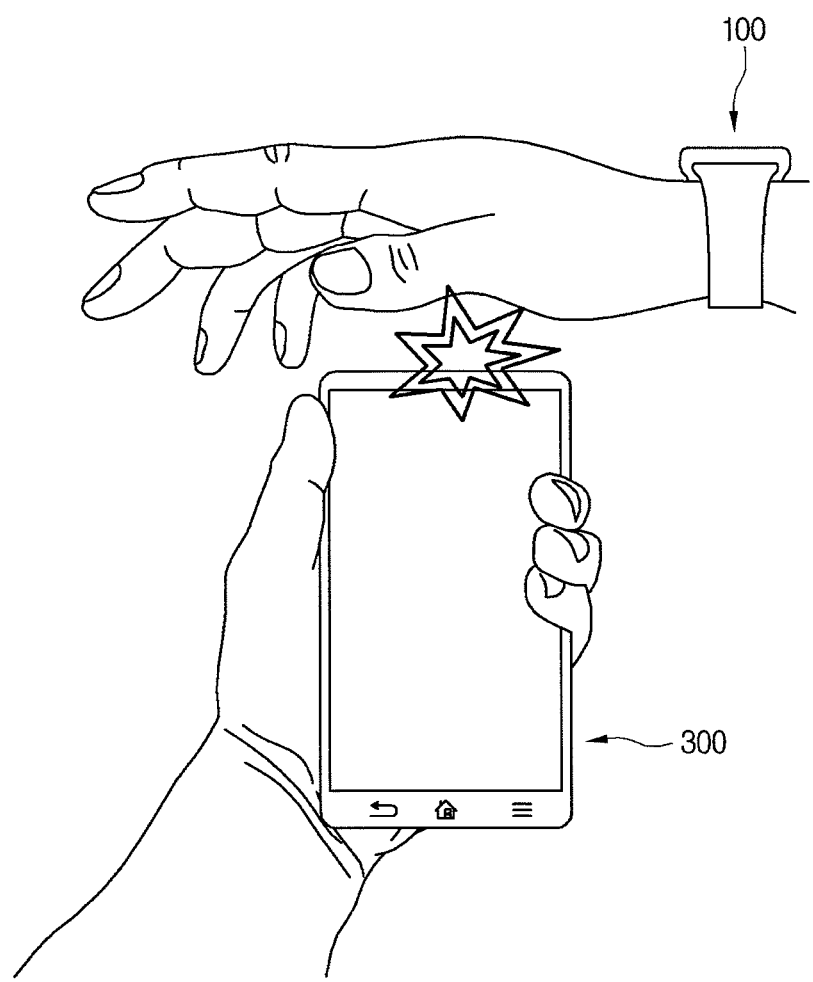
Figure 38:
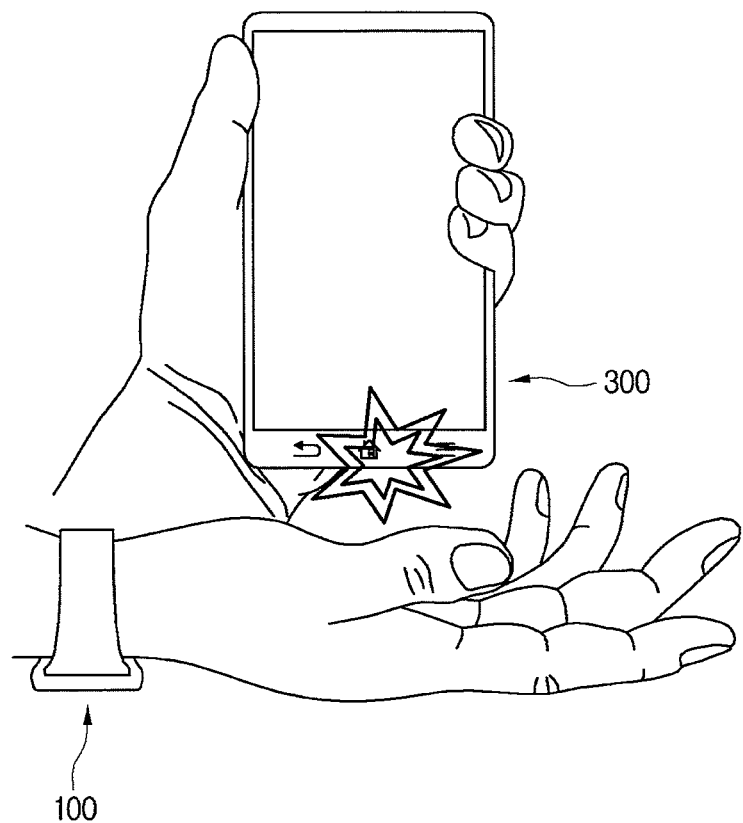

FIGS. 35 and 36 are views illustrating a fourth user gesture according to an embodiment of the present invention and FIGS. 37 and 38 are views illustrating a fifth user gesture according to an embodiment of the present invention. First, a user gesture shown in FIGS. 35 and 36 is implemented when a user grips the second terminal 300 by a hand wearing the first terminal 100 and is a gesture in which the screen of the second terminal 300 faces the top side or the bottom side.

That is, the user gesture can be a gesture for gripping the second terminal 300 to allow its screen to face in the top side direction and moving it vertically, or a gesture for gripping the second terminal 300 to allow its screen to face in the bottom side direction (the bottom) and moving it vertically.

Among them, when a user gesture for gripping the second terminal 300 to allow its screen to face in the top side direction and moving it vertically is input, the second terminal 300 can be set to be a main device and the first terminal 100 worn on a wrist can be set to be an auxiliary device, between the first and second terminals 100 and 300. In this instance, all or part of operations of an application executed on the second terminal 300 can be transferred to the first terminal 100 or an event (for example, notification information and so on) that the second terminal 300 receives can be delivered to the first terminal 100.

An event occurring from the second terminal 300 may become a message, call, and schedule notification received in a push form and a corresponding event is displayed through the first terminal 100 by such a user gesture. Further, when a user gesture for gripping the second terminal 300 to allow its screen to face in the bottom side direction and moving it vertically is input, the second terminal 300 can be set to be a sub device and the first terminal 100 worn on a wrist can be set to be a main device, between the first and second terminals 100 and 300. In this instance, all or part of operations of an application executed on the first terminal 300 can be transferred to the second terminal 100 or an event (for example, notification information and so on) occurring from the first terminal 100 receives can be delivered to the second terminal 300.

Such a user gesture can be referred to as a fourth user gesture. A case that one of terminals is used as an auxiliary device for an application operation by using a fifth user gesture is described with reference to FIGS. 37 and 38. FIG. 37 is a case that the second terminal 300 is set as an auxiliary device in order for an operation of a specific application and FIG. 38 is a case that the first terminal 100 is set as an auxiliary device. However, according to a modified embodiment, the other device can be set as an auxiliary device.

A fifth user gesture shown in FIGS. 37 and 38 is in a state of wearing or gripping the first terminal 100 and the second terminal 300 by both hands of a user and is determined by a gesture of both hands. Referring to FIG. 37, when the second terminal 300 is disposed lower than the first terminal 100, a gesture for applying impact to the upper end part of the second terminal 300 as the position of the first terminal 100 descends is shown. For example, the fifth user gesture can be a gesture for applying vibration to the second terminal 300 as a hand wearing the first terminal 100 is lowered from top to bottom.

In addition, the second terminal 300 can be used as an auxiliary device for performing an operation of an application executed on the first terminal 100. An example using a device as an auxiliary device is described with reference to FIGS. 39 to 42. FIGS. 39 to 42 are views when a second terminal is used as an auxiliary device by a fifth user gesture according to an embodiment of the present invention.

Figure 39:
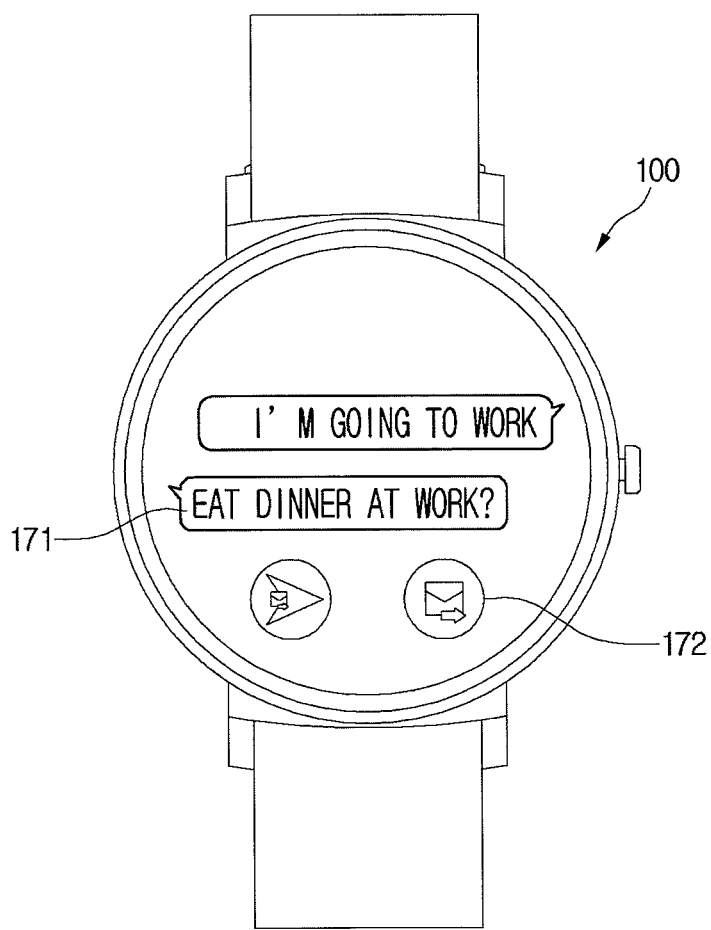
FIGS. 39 to 42 are views when a second terminal is used as an auxiliary device by a fifth user gesture according to an embodiment of the present invention.
Figure 40:
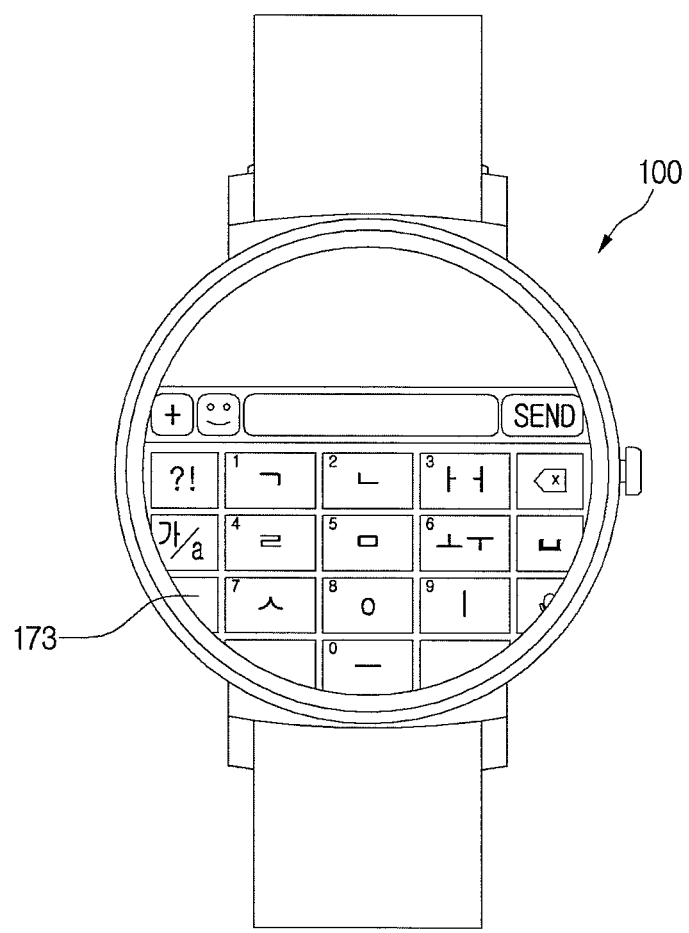
Figure 41:

First, as shown in FIG. 39, when a message is received on the screen of the first terminal 100, a message 171 received including previous dialog content can be displayed and a reply button 172 for determining whether to reply to the corresponding message 171 can be displayed. In addition, when a user selects the reply button 172 displayed on the screen of the first terminal 100, as shown in FIG. 40, a virtual keyboard 173 for inputting text can be displayed.

Figure 42:
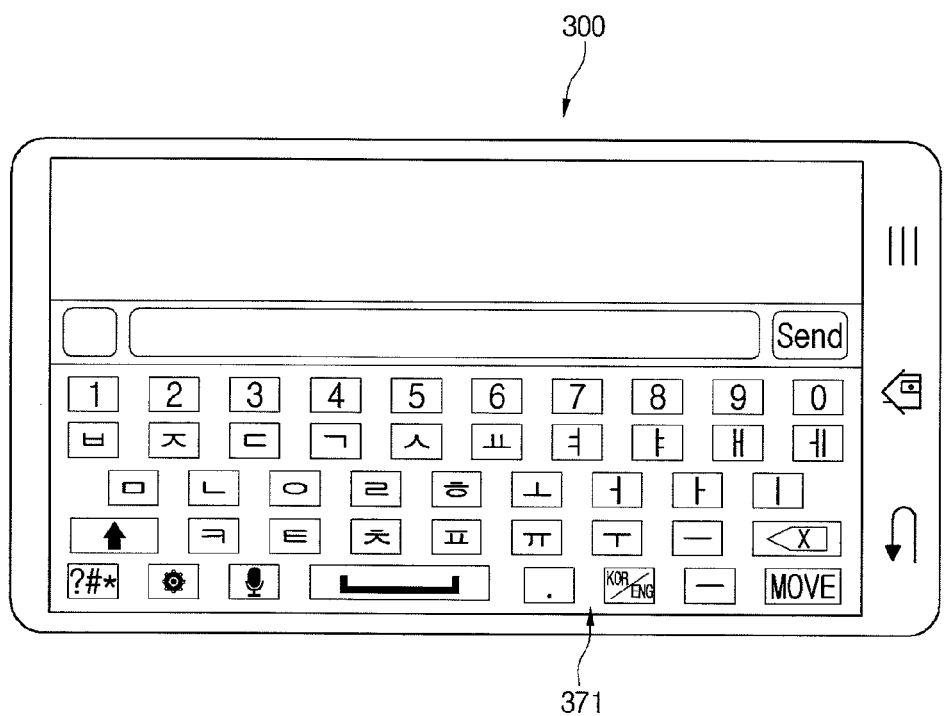

However, it is difficult for a user to input text on the bases of direct touch in the first terminal 100 having a small screen. In this instance, when the user gesture described with reference to FIG. 37 is performed, as shown in FIG. 42, the second terminal 300 is set as an auxiliary device and a large sized virtual keyboard 371 is output to the screen of the second terminal 300.

Then, when a user inputs text by manipulating the second terminal 300, the input text can be displayed on the screen of the first terminal 100 and can be transmitted to the other party according to selection. While a virtual keyboard 371 is displayed on the screen of the second terminal 300, a virtual keyboard displayed on the first terminal 100 is removed and a dialog window with the other party is displayed (see FIG. 41). Accordingly, when it is difficult for a user to directly manipulate the first terminal 100 having a small sized screen, the second terminal 300 having a large sized screen can be utilized as an auxiliary means.

Further, another example of a fifth user gesture is shown in FIG. 38. The fifth user gesture can be referred to as a gesture for setting the first terminal 100 as an auxiliary device and is a case that vibration is applied to the first terminal 100 by lowering the second terminal 300 from a higher position than the first terminal 100. That is, the fifth user gesture can be a gesture for applying impact to a hand gripping the second terminal 300 by lowering a hand wearing the first terminal 100.

Figure 43:
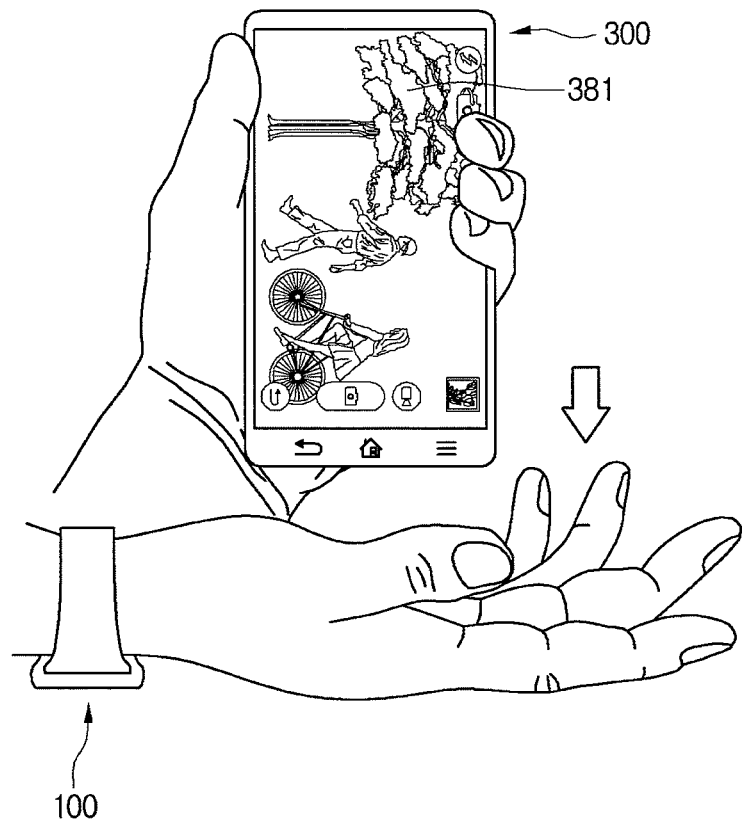
FIGS. 43 and 44 are views when a first terminal is used as an auxiliary device by a fifth user gesture according to an embodiment of the present invention.
Figure 44:
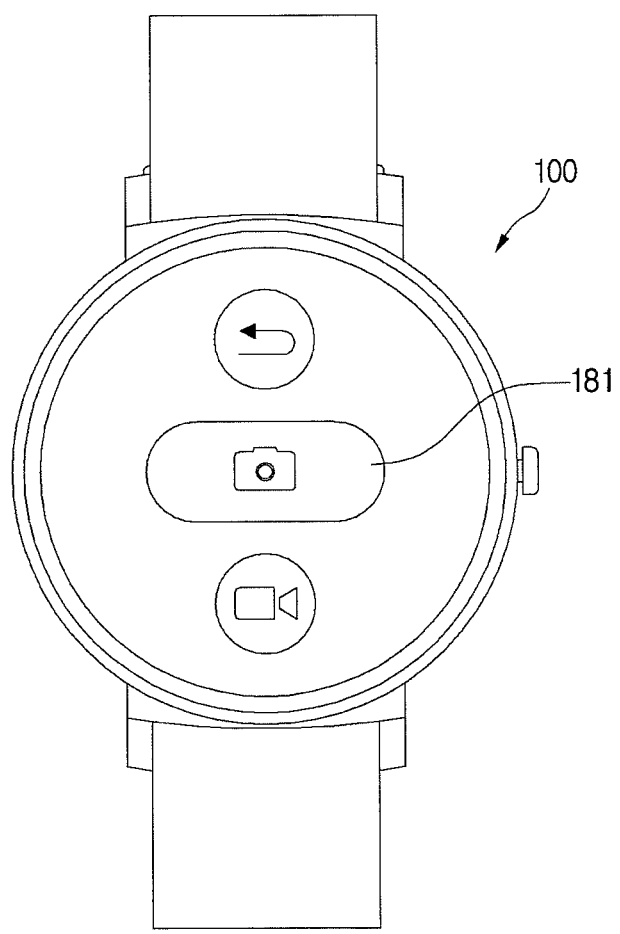

According to such a user gesture input, the first terminal 100 can be set as an auxiliary device and the first terminal 100 can be implemented as an auxiliary means for an operation of an application executed on the second terminal. An embodiment of this case is shown in FIGS. 43 and 44. FIGS. 43 and 44 are views when a first terminal is used as an auxiliary device by a fifth user gesture according to an embodiment of the present invention.

First, referring to FIG. 43, when a user captures an image by executing a camera application through the second terminal 300, a capturing appearance 381 of a subject that is a capturing target is displayed on the screen of the second terminal 300. Then, a menu such as a picture capturing button or a picture capturing button relating to a camera execution is displayed together on the screen.

In addition, when a user takes a user gesture shown in FIG. 38, the first terminal 100 is set to be an auxiliary device and In addition, as shown in FIG. 44, buttons 181 relating camera capturing are displayed on the screen of the first terminal 100 as a means for assisting a camera application operation by the second terminal 300.

That is, menus such as a capture button displayed on the screen of the second terminal 300 are displayed on the first terminal 100 by driving a camera application and start and stop of image capturing by the second terminal 300 can be performed by manipulating the first terminal 100. In addition, the second terminal 300 can be a camera and the first terminal 100 can be a remote controller for controlling the camera. Further, as mentioned above, all or part of operations of a specific application can be transferred between terminals and information on an event such as push notification can be delivered.

Figure 45:
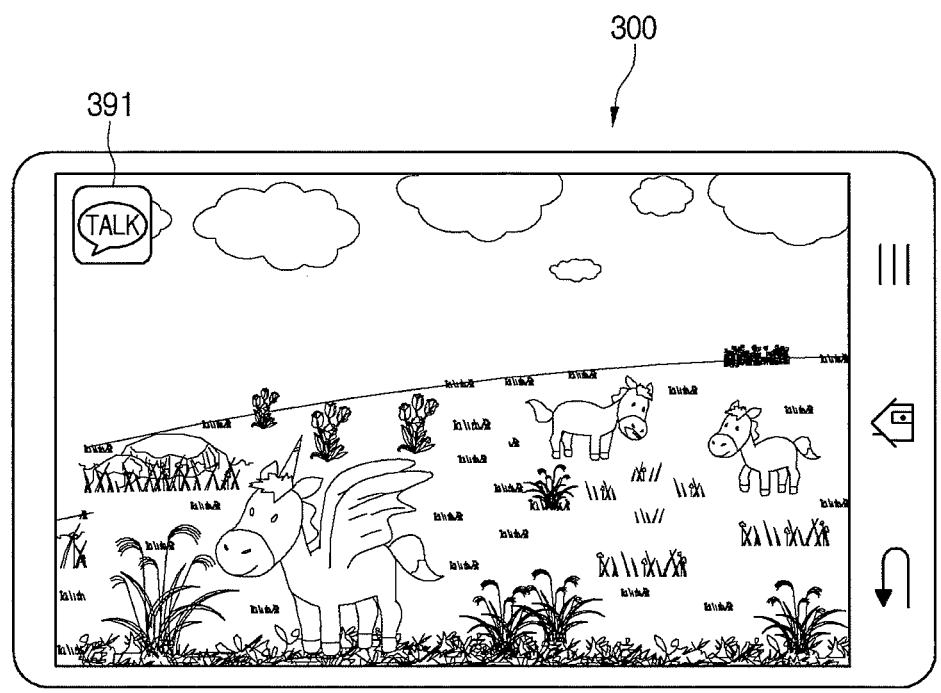
FIGS. 45 to 48 are views illustrating an operation for delivering an event between terminals according to an embodiment of the present invention.

FIGS. 45 to 48 are views illustrating an operation for delivering an event between terminals according to an embodiment of the present invention. First, as shown in FIG. 45, when a user uses the second terminal 300, an event such as message reception may occur. For example, when a movie is played through the second terminal 300, if a message is received, a notification image 391 for notifying the reception of a corresponding message is displayed on the screen.

Figure 46:
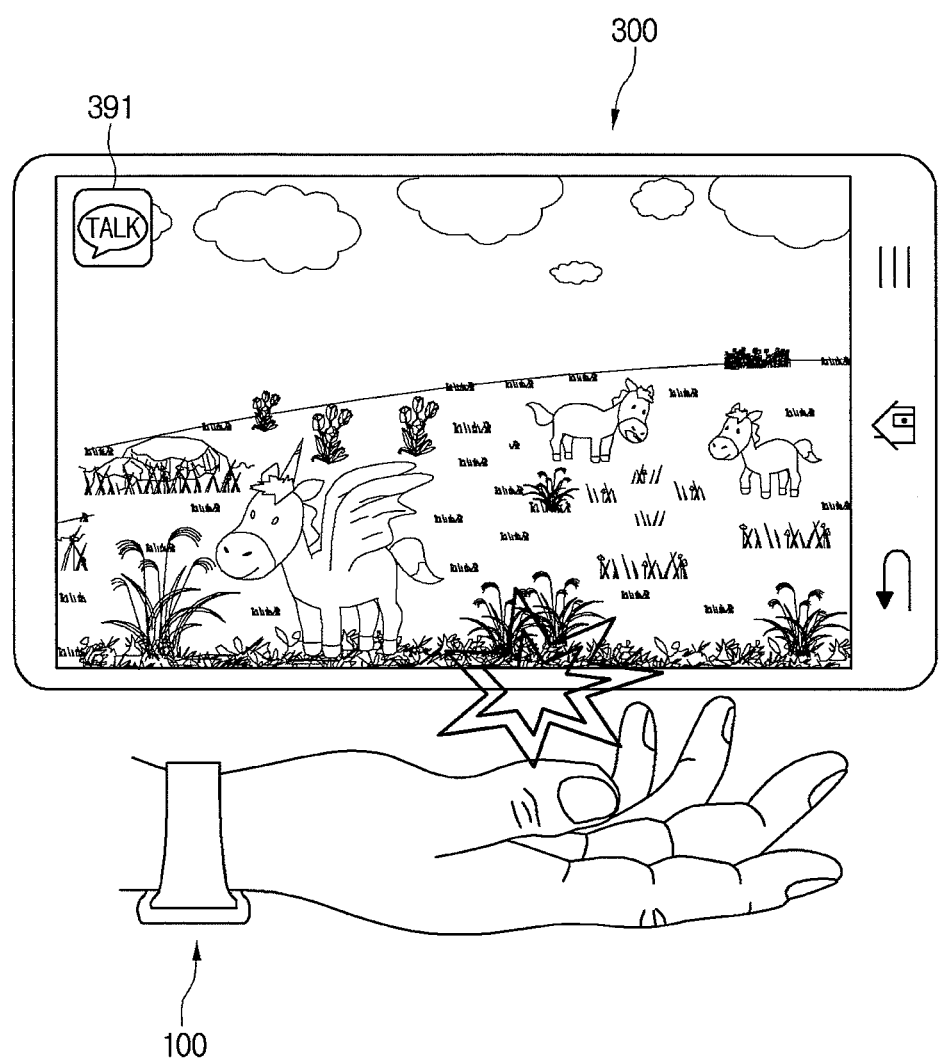
Figure 47:
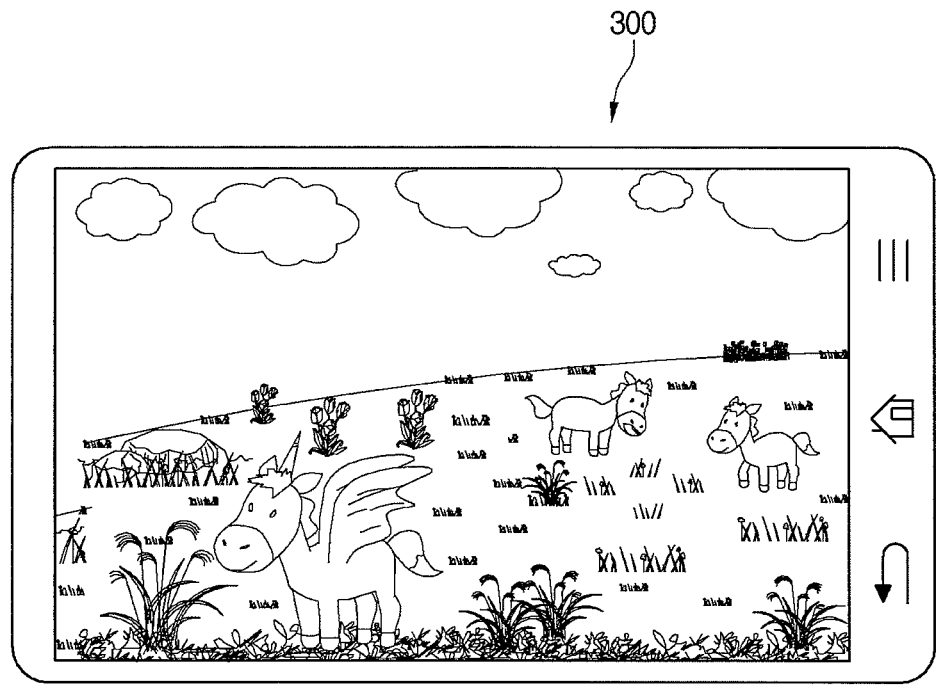

In addition, while a user wants to check an occurring event while continuously viewing a movie through the second terminal 300, as shown in FIG. 46, if a user gesture is taken, an event can be checked in the first terminal 100. That is, a user gesture shown in FIG. 46 is similar to the user gesture shown in FIG. 38. However, according to an embodiment of the present invention, if the user gesture shown in FIG. 38 is a gesture applied when the second terminal 300 stands vertically, the user gesture shown in FIG. 46 can be a gesture for moving the second terminal 300 downwardly in a state of being laid horizontally.

Figure 48:
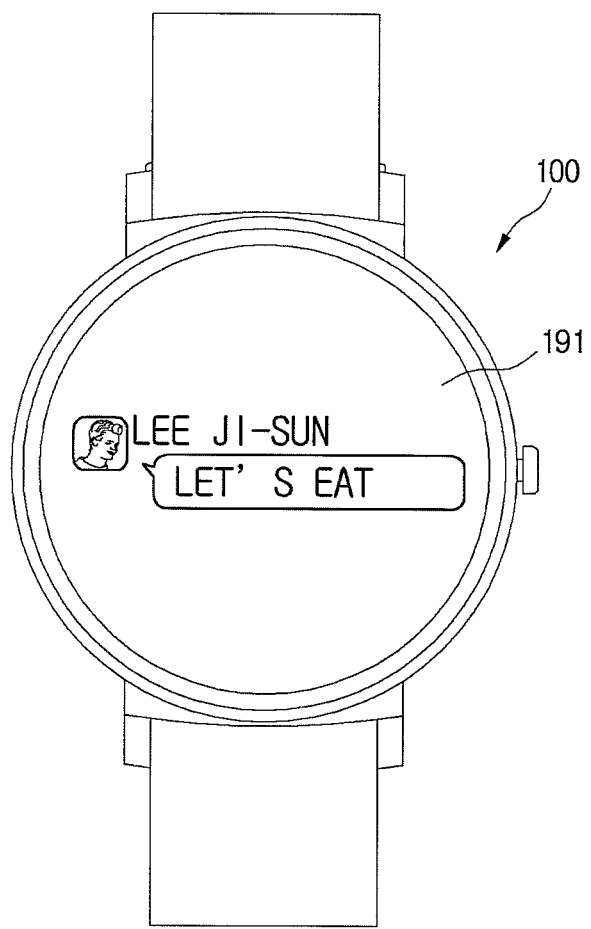

By such a gesture, all or part of operations of an application executed on the second terminal 300 can be transferred to the first terminal 100 and when an event occurs, corresponding event information can be set to be delivered to the first terminal 100. In this instance, as shown in FIG. 48, information on an event occurring from the second terminal 300 can be displayed on the screen of the first terminal 100 and event notification information generated in the second terminal 300 can be deleted.

That is, if first to fifth user gestures are input while the screens of the first terminal and the second terminals are in an off or sleep state, event information occurring from a terminal set to be as a main device can be displayed on the screen of a terminal set as a sub device. Then, as shown in FIGS. 45 to 48, when the screens of terminals are turned on, event information occurring from one terminal can be transferred and displayed on another terminal.

In such a way, user convenience can be further improved by variously combining user gestures and the utilization of a wearable device can be further increased through such embodiments. Effects of a wearable device according to an embodiment of the present invention and a mobile terminal communicable therewith are described as follows.

According to at least one of embodiments of the present invention, as a user gesture based operation is implemented between a wearable device and a mobile terminal, a user's intention is identified quickly and various conveniences can be provided to a user therefrom.

According to at least one of embodiments of the present invention, since a user gesture is determined based on state information of a wearable device and a mobile terminal, it is possible to accurately determine an operation that a user requires.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A wearable device, comprising:
   a touch screen;
   a short-range communication circuit configured to perform wireless communication with a mobile terminal;
   a sensor configured to sense at least one of a wearable device acceleration signal and a wearable device vibration signal; and
   a controller configured to:
      receive first state information from the sensor indicating the at least one of the wearable device acceleration signal and the wearable device vibration signal,
      receive second state information from the mobile terminal indicating sensed at least one of a mobile terminal acceleration signal and a mobile terminal vibration signal of the mobile terminal, and
      set one of the wearable device and the mobile terminal as an auxiliary device based on the first and second state information, respectively,
   wherein the auxiliary device performs an auxiliary function, wherein an application is executed in the wearable device and the mobile terminal, and
   wherein the controller is further configured to:
      display an enlargement user interface (UI) on the touch screen corresponding to a partial area of an application screen of the application being executed on the mobile terminal responsive to the wearable device being set as the auxiliary device according to sensing the at least one of the wearable device acceleration signal and the wearable device vibration signal.

2. The wearable device according to claim 1, wherein the controller is further configured to display an image received from the mobile terminal on the touch screen when only the wearable device vibration signal is sensed by the sensor.

3. The wearable device according to claim 2, wherein the controller is further configured to transfer an image displayed on the touch screen to at least part of a screen where an application is executed on the mobile terminal.

4. The wearable device according to claim 3, wherein the image displayed on the touch screen comprises at least one menu for controlling an operation of the application being executed on the mobile terminal.

5. The wearable device according to claim 3, wherein the image displayed on the touch screen comprises a list of at least one content information or content relating to the application executing on the mobile terminal.

6. The wearable device according to claim 3, wherein the image displayed on the touch screen comprises event information occurring on the mobile terminal.

7. The wearable device according to claim 1, wherein the application being executed on the mobile terminal corresponds to a map application and the enlargement UI corresponds to a partial area of a map application screen of the map application, and
   wherein the controller is further configured to:
      turn off the touch screen, and
      turn on the touch screen and display the enlargement UI on the touch screen when the wearable device is set as the auxiliary device.

8. A mobile terminal, comprising:
   a short-range communication circuit configured to perform wireless communication with a wearable device;
   a touch screen;
   a sensor configured to sense at least one of a mobile terminal acceleration signal and a mobile terminal vibration signal; and
   a controller configured to:
      receive first state information from the wearable device indicating sensed at least one of a wearable device acceleration signal and a wearable device vibration signal of the wearable device,
      receive second state information from the sensor indicating said at least one of the mobile terminal acceleration signal and the mobile terminal vibration signal of the mobile terminal, and
      set one of the wearable device and the mobile terminal as an auxiliary device, based on the first and second state information, respectively,
   wherein the auxiliary device performs an auxiliary function, wherein an application is executed in the wearable device and the mobile terminal, and
   wherein the controller is further configured to:
      remotely control the wearable device via said short-range communication circuit to display an enlargement user interface (UI) corresponding to a partial area of an application screen of the application being executed on the mobile terminal responsive to the wearable device being set as the auxiliary device according to receiving the first state information from the wearable device.

9. The mobile terminal according to claim 8, wherein, when the first state information includes only the wearable device vibration signal and the second state information includes both the mobile terminal acceleration signal and the mobile terminal vibration signal, the controller is configured to transfer partial operations of the executing application to the wearable device.

10. The mobile terminal according to claim 8, wherein the controller is configured to transfer, to the wearable device, identical information of the executing application displayed on the touch screen with a reduce size to match a display of the wearable device.

11. The mobile terminal according to claim 8, wherein the controller is configured to transfer information including a menu for controlling an operation of the executing application to the wearable device.

12. The mobile terminal according to claim 8, wherein the controller is configured to transfer event information occurring from a second application different from the executing application to the wearable device.

13. The mobile terminal according to claim 8, wherein when the first state information includes both the wearable device acceleration signal and the wearable device vibration signal and the second state information includes only the mobile terminal vibration signal, the controller is configured to execute an application corresponding to an image displayed on the wearable device.

14. The mobile terminal according to claim 13, wherein the controller is further configured to:
 display a virtual keyboard on the touch screen, and
 transfer text input through the virtual keyboard to the wearable device.

15. The mobile terminal according to claim 8, wherein the controller is further configured to transfer event information to the wearable device corresponding to an event occurring on the mobile terminal.

16. The mobile terminal of claim 8, wherein when the first state information includes only the wearable device vibration signal and the second state information includes both the mobile terminal acceleration signal and the mobile terminal vibration signal, the controller is configured to designate the mobile terminal as a main device executing the application and the wearable terminal as a sub device displaying partial information the application executing on the mobile terminal.

17. The mobile terminal of claim 8, wherein when the first state information includes both the wearable device vibration signal and wearable device acceleration signal, and the second state information includes only the mobile terminal vibration signal, the controller is configured to designate the wearable device as a main device and the mobile terminal as a sub device displaying partial information the application executing on the wearable device.

18. A method of controlling a mobile terminal, the method comprising:
 performing, via a short-range communication circuit, wireless communication with a wearable device;
 sensing, via a sensor, at least one of a mobile terminal acceleration signal and a mobile terminal vibration signal;
 receiving, via a controller, first state information from the wearable device indicating sensed at least one of a wearable device acceleration signal and a wearable device vibration signal of the wearable device;
 receiving, via the controller, second state information from the sensor indicating said at least one of the mobile terminal acceleration signal and the mobile terminal vibration signal of the mobile terminal; and
 setting, via the short-range communication circuit, one of the wearable device and the mobile terminal as an auxiliary device based on the first and second state information, respectively,
 wherein the auxiliary device performs an auxiliary function, wherein an application is executed in the wearable device and the mobile terminal, and
 wherein the method further comprises:
  remotely controlling by the controller, via the short-range communication circuit, the wearable device to display an enlargement user interface (UI) corresponding to a partial area of an application screen of the application being executed on the mobile terminal responsive to the wearable device being set as the auxiliary device according to receiving the first state information from the wearable device.

19. The method according to claim 18, wherein, when the first state information includes only the wearable device vibration signal and the second state information includes both the mobile terminal acceleration signal and the mobile terminal vibration signal, the method further comprises transferring partial operations of the executing application to the wearable device.

20. The method according to claim 18, further comprising:
 transferring, to the wearable device, identical information of the executing application displayed on the touch screen with a reduce size to match a display of the wearable device.

21. The method according to claim 18, further comprising:
 transferring information including a menu for controlling an operation of the executing application to the wearable device.

* * * * *